(12) United States Patent
Chundru et al.

(10) Patent No.: US 9,836,893 B2
(45) Date of Patent: Dec. 5, 2017

(54) COMPUTING AND TRACKING LOCOMOTIVE HEALTH

(71) Applicant: Union Pacific Railroad Company, Omaha, NE (US)

(72) Inventors: Srinivas Chundru, Broomfield, CO (US); Kathleen Ann Fenn, Omaha, NE (US); Glenn Allan Millar, Omaha, NE (US)

(73) Assignee: Union Pacific Railroad Company, Omaha, NE (US)

( * ) Notice: Subject to any disclaimer, the term of this patent is extended or adjusted under 35 U.S.C. 154(b) by 250 days.

(21) Appl. No.: 14/678,709

(22) Filed: Apr. 3, 2015

(65) Prior Publication Data

US 2016/0292931 A1 Oct. 6, 2016

(51) Int. Cl.
*G07C 5/08* (2006.01)
*G07C 5/00* (2006.01)
*G06Q 10/00* (2012.01)
*B61L 27/00* (2006.01)

(52) U.S. Cl.
CPC .............. *G07C 5/006* (2013.01); *G06Q 10/00* (2013.01); *G07C 5/085* (2013.01); *G07C 5/0808* (2013.01); *G07C 5/0841* (2013.01); *B61L 27/00* (2013.01)

(58) Field of Classification Search
None
See application file for complete search history.

(56) References Cited

U.S. PATENT DOCUMENTS

2003/0055666 A1\* 3/2003 Roddy ................ B61L 27/0094
705/305

\* cited by examiner

*Primary Examiner* — Rami Khatib
*Assistant Examiner* — Gerrad A Foster
(74) *Attorney, Agent, or Firm* — Thompson Coburn LLP

(57) ABSTRACT

Herein described is at least a system, method, and/or non-transitory computer-readable storage medium for computing locomotive health based on input parameters such as locomotive defect data and locomotive inspection data. Examples of locomotive health attributes for which values may be computed include an overall health attribute, a power level health attribute, a defect severity health attribute, a trail only health attribute, and a health reason attribute. Furthermore, various events may be defined that may trigger computation of the locomotive health attribute values.

27 Claims, 25 Drawing Sheets

| Item No. | Health Attribute | Allowed Values |
|---|---|---|
| 1 | Overall | G - Green<br>W - White<br>Y - Yellow<br>R - Red<br>B - Blue |
| 2 | Power Level | 0-No Power<br>50-Partial Power<br>100-Full Power |
| 3 | Trail Only | Y - Yes<br>N - No<br>N/A - Not applicable |
| 4 | Defect Severity | W- White<br>R- Red<br>Y-Yellow<br>N- No |
| 5 | Health Reason | F- FRA Inspection Due<br>D- Defect<br>F,D- FRA Inspection Due, Defect |

Figure 4

| | Color of the Most Severe Defect | Power level code | Fra Inspection | LHC Color | Health PWR | Health Trail only | Health Reason | Health table Color of the Most Severe Defect |
|---|---|---|---|---|---|---|---|---|
| 1 | Red | 0 | N/A | Blue | 0 | T* | D | R |
| 2 | Red | 50 | N/A | Red | 50 | T* | D | R |
| 3 | Red | 100 | N/A | Red | 100 | T* | D | R |
| 4 | Red | 0 | Past Due | Blue | 0 | T* | D,F | R |
| 5 | Red | 50 | Past Due | Blue | 0 | T* | F | R |
| 6 | Red | 100 | Past Due | Blue | 0 | T* | F | R |
| 7 | Red | 0 | 0-3 | Blue | 0 | T* | D | R |
| 8 | Red | 50 | 0-3 | Red | 50 | T* | D | R |
| 9 | Red | 100 | 0-3 | Red | 100 | T* | D | R |
| 10 | Red | 0 | 4-10 | Blue | 0 | T* | D | R |
| 11 | Red | 50 | 4-10 | Red | 50 | T* | D | R |
| 12 | Red | 100 | 4-10 | Red | 100 | T* | D | R |
| 13 | Yellow | 0 | N/A | Blue | 0 | T* | D | Y |
| 14 | Yellow | 50 | N/A | Red | 50 | T* | D | Y |
| 15 | Yellow | 100 | N/A | Yellow | 100 | T* | D | Y |
| 16 | Yellow | 0 | Past Due | Blue | 0 | T* | D,F | Y |
| 17 | Yellow | 50 | Past Due | Blue | 0 | T* | F | Y |
| 18 | Yellow | 100 | Past Due | Blue | 0 | T* | F | Y |
| 19 | Yellow | 0 | 0-3 | Blue | 0 | T* | D | Y |
| 20 | Yellow | 50 | 0-3 | Red | 50 | T* | D | Y |
| 21 | Yellow | 100 | 0-3 | Red | 100 | T* | F | Y |
| 22 | Yellow | 0 | 4-10 | Blue | 0 | T* | D | Y |
| 23 | Yellow | 50 | 4-10 | Red | 50 | T* | D | Y |
| 24 | Yellow | 100 | 4-10 | yellow | 100 | T* | D | Y |
| 25 | White | 0 | N/A | Blue | 0 | T* | D | W |
| 26 | White | 50 | N/A | Red | 50 | T* | D | W |
| 27 | White | 100 | N/A | White | 100 | T* | D | W |
| 28 | White | 0 | Past Due | Blue | 0 | T* | D,F | W |
| 29 | White | 50 | Past Due | Blue | 0 | T* | F | W |
| 30 | White | 100 | Past Due | Blue | 0 | T* | F | W |
| 31 | White | 0 | 0-3 | Blue | 0 | T* | D | W |
| 32 | White | 50 | 0-3 | Red | 50 | T* | D | W |
| 33 | White | 100 | 0-3 | Red | 100 | T* | F | W |
| 34 | White | 0 | 4-10 | Blue | 0 | T* | D | W |
| 35 | White | 50 | 4-10 | Red | 50 | T* | D | W |
| 36 | White | 100 | 4-10 | yellow | 100 | T* | F | W |
| 37 | None | | Past Due | Blue | 0 | T* | F | N |
| 38 | None | | 0-3 | Red | 100 | T* | F | N |
| 39 | None | | 4-10 | Yellow | 100 | T* | F | N |
| 40 | None | | N/A | Green | 100 | T* | | N |

Figure 6

Table Name –LHC Attribute Definition

| Column Name | Logical Name | Data Type | Nullable | Description |
|---|---|---|---|---|
| <Name String> | Attribute Identifier | ... | N | ORACLE Sequence Number |
| <Name String> | Attribute Name | ... | N | Attribute Name |
| <Name String> | Attribute Description | ... | Y | Attribute Description |
| <Name String> | Last updated Date | ... | N | Date & Time the record was updated |
| <Name String> | Last updated User Id | ... | N | Updated user id |

Figure 7

Table Name –LHC Attribute Value Definition

| Column Name | Logical Name | Data Type | Nullable | Description |
|---|---|---|---|---|
| <Name String> | Attribute Value Identifier | NUMBER(11) | N | ORACLE Sequence Number |
| <Name String> | Attribute Identifier | NUMBER(11) | N | Attribute Identifier (from Figure 7 table) |
| <Name String> | Attribute Value Name | VARCHAR2(25) | N | Attribute Value Name |
| <Name String> | Attribute Value Description | VARCHAR2(200) | Y | Attribute Value Description |
| <Name String> | Last updated Date | DATE | N | Date & Time the record was updated |
| <Name String> | Last updated User Id | VARCHAR2(8) | N | Updated user id |
| <Name String> | Last value full name | VARCHAR2(25) | Y | Last value full name |

Figure 8

Table Name –LHC Health

| Column Name | Logical Name | Data Type | Nullable | Description |
|---|---|---|---|---|
| <Name String> | Locomotive Health Condition Health Sequence | ... | N | ORACLE Sequence Number |
| <Name String> | Physical Resource Identifier | ... | N | Unique id of the equipment. |
| <Name String> | Condition Color Code | ... | N | Holds the overall health color code for the equipment.<br>G - Green<br>W - White<br>Y - Yellow<br>R - Red<br>B-Blue<br>Null - None |
| <Name String> | Power level code | ... | Y | Designates if the locomotive has partial horsepower.<br>    0-No Power<br>    50-Partial Power<br>    100-Full Power |
| <Name String> | Trail Only Indicator | ... | Y | Indicator that designates if the locomotive is trail only and cannot lead.<br>Y - Trail Only<br>N - No (default)<br>N/A - Not Applicable |
| <Name String> | Health Reason | ... | Y | F-FRA Inspection DUE<br>D- Defect<br>F,D- Both |
| <Name String> | Defect Severity Color Code | ... | Y | W- White<br>R- Red<br>Y-Yellow<br>N- No |
| <Name String> | Active Indicator | ... | Y | Designates if the The record is current or Historic.<br>C - Current<br>H - Historic |
| <Name String> | Health Comments | ... | Y | Holds the comments for the health. |
| <Name String> | Created Date | ... | Y | Date & Time the record was updated /created. |
| <Name String> | Last updated Date | ... | N | Date & Time the record was updated |
| <Name String> | Last updated User Id | ... | N | Updated user id |
| <Name String> | Health color change date | ... | Y | Health color change date |

Figure 9

Table Name – Locomotive Health Reason Source Association

| Column Name | Logical Name | Data Type | Nullable | Description |
|---|---|---|---|---|
| <Name String> | Locomotive Health Condition Health Sequence | ... | N | Locomotive Health Condition Health Sequence (from Figure 9 table) |
| <Name String> | Attribute Identifier | ... | N | LHC Health Attribute ID (from Figures 7 and 8 tables) |
| <Name String> | Source Identifier | ... | N | Source ID (from Figure 11 table) |
| <Name String> | Reason Text | ... | Y | Reason for Overall health condition per attribute |
| <Name String> | Last updated Date | ... | N | Date & Time the record was updated |
| <Name String> | Last updated User Id | ... | N | Updated user id |

Figure 10

Table Name – Locomotive Health Reason Source

| Column Name | Logical Name | Data Type | Nullable | Description |
|---|---|---|---|---|
| <Name String> | Source Identifier | ... | N | ORACLE Sequence Number |
| <Name String> | Physical Resource Identifier | ... | N | Unique id of the equipment. |
| <Name String> | Source Type | ... | N | A key identifier on the source system based on which the health is determined. Value: 'D' for defects 'I' for Inspections and 'S' for Status Changes. |

Figure 11

Table Name - Defect Source

| Column Name | Logical Name | Data Type | Nullable | Description |
|---|---|---|---|---|
| <Name String> | Source Identifier | ... | N | Source ID (from Figure 11 table) |
| <Name String> | Defect Identifier | ... | N | Unique id for the defect |
| <Name String> | Severity Color Code | ... | N | Holds the overall health color code for the equipment.<br>G - Green<br>W - White<br>Y - Yellow<br>R - Red<br>Null - None |
| <Name String> | Power level code | ... | Y | Designates if the locomotive has partial horsepower.<br>    0-No Power<br>        50-Partial Power<br>        100-Full Power |
| <Name String> | Trail Only Indicator | ... | Y | Indicator that designates if the locomotive is trail only and cannot lead.<br>Y - Trail Only<br>N - No (default) |
| <Name String> | Last updated Date | ... | N | Date & Time the record was updated |
| <Name String> | Last updated User Id | ... | N | Updated user id |
| <Name String> | Created Date | ... | Y | Date & Time the record was updated /created. |

Figure 12

Table Name – Locomotive Health Inspection Source

| Column Name | Logical Name | Data Type | Nullable | Description |
|---|---|---|---|---|
| <Name String> | Source Identifier | ... | N | Source ID (from Figure 11 table) |
| <Name String> | Inspection Identifier | ... | N | Unique id for the inspection |
| <Name String> | Inspection Code | ... | N | Code to determine the inspection type like PI,AI. |
| <Name String> | Inspection Due Date | ... | N | Inspection Due Dates |
| <Name String> | Last updated Date | ... | N | Date & Time the record was updated |
| <Name String> | Last updated User Id | ... | N | Updated user id |
| <Name String> | Created Date | ... | Y | Date & Time the record was updated /created. |

Figure 13

MCS - Locomotive Health Condition  Health Status

Home ( • ) Search Criteria

Locomotive ID: [UP3834]  Model #: [*for wildcard search]  Health: [All ▼]  Health Resn: [All ▼]

From Date: [    ] [12]  Locomotive Type: [All ▼]  Power Level: [All ▼]  % Calculate Resn: [All ▼]

To Date: [    ] [12]  LHC Status: [Current ▼]  Trail Only: [All ▼]  Defect Color: [All ▼]

[Search]  [Reset]

Results Per Page: [20 ▼]  Export to Excel

Locomotive Health Conditions

| Locomotive ID | Model # | Health | Power Level | TO | Created Tmst | Last Uptd Tmst | Reason | Defect Color | Comment | Calculate Reason | LHC Status |
|---|---|---|---|---|---|---|---|---|---|---|---|
| UP3834 | SD70M | Blue | 0% | N | 03/16/2012 04:02:39 | 03/16/2012 04:08:09 | D | Red | 0% Power - LOADING IN POWER/GROUND DETECTED; | SYS_SCHD | C |

1
1 Locomotive(s) found, displaying 1 records from 1 to 1 on page 1/1

FIG. 14

Health Details for UP3834 - (42660242) -

Locomotive - UP3834 (SD70M)

Locomotive Health Condition

| Health | Power Level | TO | Created Tmst | Last Updtd Tmst | Health Resn | Defect Color | Calculate Reason |
|---|---|---|---|---|---|---|---|
| Blue | 0% | N | 03/16/2012 04:02:39 | 03/16/2012 04:08:09 | D | Red | SYS-SCHD |

Health Comments 0% Power - LOADING IN POWER/GROUND DETECTED:

Open Defect(s)

| Function | Behavior | Crew Message | Occurrence Timestamp | Severity Color | RF | TO | Power Level | Defect ID |
|---|---|---|---|---|---|---|---|---|
| LOADING IN POWER | GROUND DETECTED | | 03/16/2012 03:53:00 | Red | Y | N | 0% | 2137154 |

Open RX(s)-No Open RX(s) Found

| Open Date | Severity Color | Case | Problem | RX Number |
|---|---|---|---|---|

Open RM(s)-No Open RM(s) Found

| Date | Location | Comments |
|---|---|---|

Open ED(s)-No Open ED(s) Found

| Noun Desc | Verb Desc | Last Updt. Timestamp |
|---|---|---|

Inspection(s)/EC Due

| Work Code | Actual Last Inspection Date | Next Scheduled Date |
|---|---|---|
| PI | 02/03/2012 | 05/04/2012 |
| EC | 02/03/2012 | 05/04/2012 |
| AI | 02/03/2012 | 02/04/2013 |
| BI | 02/08/2010 | 02/18/2014 |

Health Calculation History (Reason and Date)

| Calculate Reason | Calculate Date |
|---|---|
| SYS_SCHD | 03/16/2012 04:08:09 |
| DEF_UPD | 03/16/2012 04:02:29 |

FIG. 15

| Command or Search | | Go | My Top Functions ▼ | | | | | | | | | | | | | | | |
|---|---|---|---|---|---|---|---|---|---|---|---|---|---|---|---|---|---|---|
| My Work | | Locomotive Assignment Inquiry = (LI) | | New Tab | | | | | | | | | | | | | | |

| Loco ID | Mod_Yr | HP | EPA | Hlth | Y.C.C.A | C.A.C.C | H.C. | D.S.P. | A.T.X. | A.D.B. | S.I.B. | D.B. | W.M.S. | M.S. | Pool | NTWK | PTC | EM | Y | Train ID | D | Pickup Setout |
|---|---|---|---|---|---|---|---|---|---|---|---|---|---|---|---|---|---|---|---|---|---|---|
| UP 3834 (Freight) | SD70M-04 | 4000 | 10.4 | Blue | Y | Y | Y | B | - | Y | 6 | 3 | E | N | Y | RE-RED UNIT | Red | N | - | Y | ZLAMQ 15 ▾ | F | CX809 ▾ 03/16/0729<br>TP250 ▾ 03/17/0206 |

UP 3834 (SD70M Locomotive - 04)

Locomotive ID: UP 3834 ▾

Locomotive 1 of 1

⊖ Event

| Event | Date/Time | Location | Train ID / RD |
|---|---|---|---|
| Last Reported | AR | 03/16/1146 | PECOS, TX | ZLAMQ 15 ▾ |

⊖ IM - Inspection/Maintenance

| Work Code | Last Completed | | Next Completed | |
|---|---|---|---|---|
| | Location | Date | Drop Dead | Projected |
| AI | TP250 ▾ | 02/03/2012 | 02/04/2013 | 02/04/2013 |
| BI | TP250 ▾ | 02/08/2010 | 02/18/2014 | 02/18/2014 |
| CS | TP250 ▾ | 02/03/2012 | | 05/04/2012 |
| EC | TP250 ▾ | 02/03/2012 | | 05/04/2012 |
| IN | CX8095 ▾ | 03/15/2012 | | 03/16/2012 |
| LS | X 344D ▾ | 02/29/2012 | | 03/15/2012 |
| LU | TP250 ▾ | 02/03/2012 | | 03/19/2012 |
| M1 | X 344D ▾ | 02/29/2012 | | 06/19/2012 |
| M2 | OX5 91 ▾ | 09/10/2011 | | 06/19/2012 |
| M3 | SP760D ▾ | 02/03/2011 | | 06/19/2012 |
| M6 | | 01/29/2009 | | 08/21/2012 |

FIG. 16A

| MZ | TP250 ⌄ | 02/08/2010 | | 11/26/2015 |
|---|---|---|---|---|
| PI | TP250 ⌄ | 02/03/2012 | 05/04/2012 | 05/04/2012 |
| SO | X344E ⌄ | 02/12/2012 | | 04/12/2012 |

Overdue: 03/15(LS)
Current: IN,LU,RX,SI
NextDue: 03/19(LU)

⊖ Locomotive Health Condition

| Color | Power Level | TO | Created Timestamp | Comment | Reason |
|---|---|---|---|---|---|
| Blue | 0% | N | 03/16/2012 04:02 | 0% POWER - LOADING IN POWER/ GROUND DETECTED; | D |

⊖ Locomotive Uniform Defects(1)

| Occurrence Timestamp | Severity Color | Function | Behavior | TO | Power Level |
|---|---|---|---|---|---|
| 03/16/2012 03:53 | Red | LOADING IN POWER | GROUND DETECTED | N | 0% |
| INITIAL COMMENTS - CREW REPORTS THE UNIT STOPPED LOADING IN POWER, TRIPS GROWING RELAY AND GROUND RELAY LOCKOUT REPEATEDLY WHEN UNDER A LOAD IN POWER, TRIPS IMMEDIATELY WHEN IN POWER IN ANY THROTTLE NOTCH. UNIT IS NOW ISOLATED AND IDLING. IS NOT WEATHER RELATED. 0400CST-PMR/OMA | | | | | |

Return to Summary

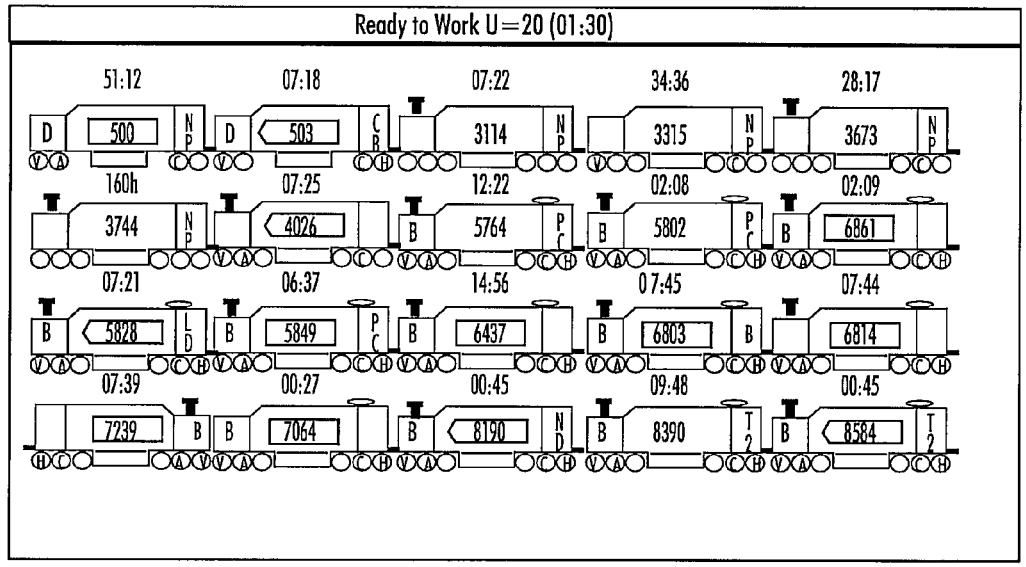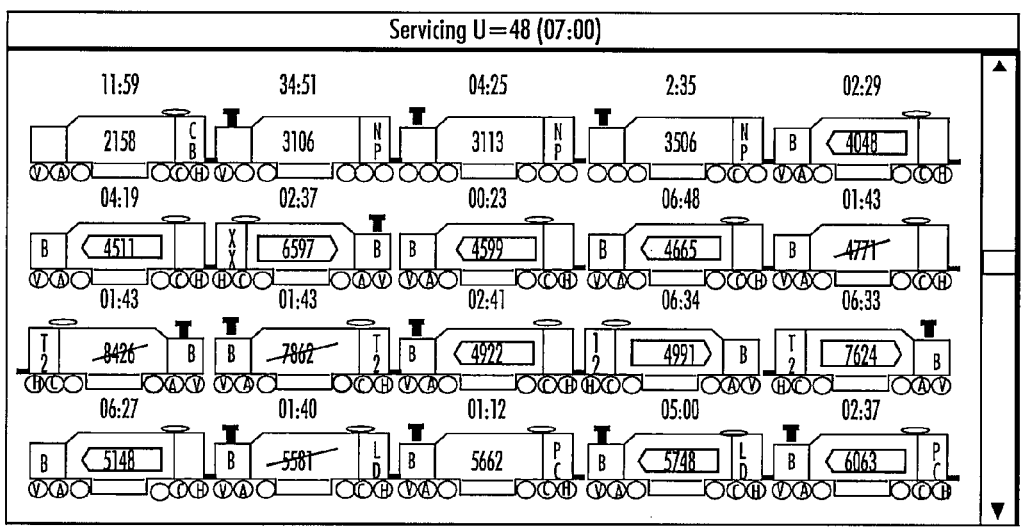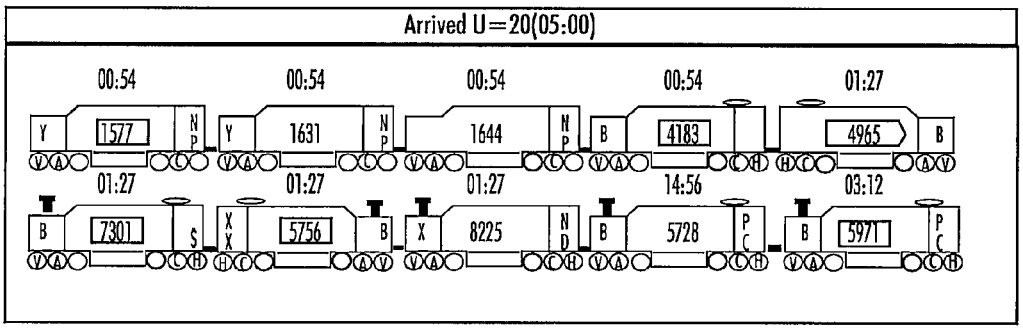
FIG. 18C

COMPUTING AND TRACKING LOCOMOTIVE HEALTH

BACKGROUND

Efficiently managing the logistics of properly assigning large numbers of locomotives to train consists to satisfy transportation needs of high volumes of geographically distributed freight and cargo represents a significant challenge. Among the numerous factors that impact this challenge are the differing operational conditions of the locomotives used to form the train consists. However, properly tracking and quantifying the different operational conditions of the locomotives within a fleet of locomotives represents a significant technical challenge.

SUMMARY

The following presents a simplified summary of the present disclosure in order to provide a basic understanding of some aspects described herein. The summary is not an extensive overview, and is not intended to identify key or critical elements or to delineate the scope of the claims. The summary merely presents various described aspects in a simplified form as a prelude to the more detailed description provided below.

According to some embodiments, a system comprises a processor and a memory that stores a plurality of processor-executable instructions. Upon execution of the instructions by the processor, the system (1) receives data about a locomotive, the received data comprising defect data for the locomotive and inspection data for the locomotive, (2) computes health data for the locomotive based on the defect data and the inspection data, and (3) communicates a value for the computed locomotive health data to a computer for display of the computed locomotive health data value to a user of the computer such as a planner or manager of train operations who makes decisions about which locomotives should be assigned to train consists.

According to some embodiments, a method is described that comprises processing defect data and inspection data for a locomotive to compute locomotive health. The computed locomotive health may then be communicated in association with an identifier for the locomotive to a computer for display of the computed locomotive health data value to a user of the computer such as a planner or manager of train operations who makes decisions about which locomotives should be assigned to train consists.

According to some embodiments, a non-transitory computer-readable storage medium on which a computer program is stored is described, where a code section of the computer program may be executed by a computer to cause the computer to process defect data and inspection data for a locomotive to compute locomotive health.

According to some embodiments, the locomotive health computations may be performed on a large pool of locomotives (e.g., 100 or more locomotives which may be geographically distributed over a large area such as throughout the United States or North America) using health metrics that are standardized across the locomotive pool, thus providing locomotive management/planning application(s) with a common source of standardized information regarding locomotive health.

According to some embodiments, the locomotive health computations may be triggered on a real-time basis in response to underlying changes in the data that describe the subject locomotives. As used herein, "real-time basis" with regard to locomotive health computations refers to an event-driven triggering of locomotive health computations such that, when the underlying data that impacts locomotive health is created or changed within a computer system, this locomotive data is quickly detected and triggers a new computation of locomotive health for the impacted locomotive. For example, health event messages may be automatically generated by systems that manage underlying locomotive data when changes in the underlying locomotive data are detected, and these health event messages may in turn trigger updated locomotive health computations through a first in first out (FIFO) processing queue that feeds a locomotive health calculator that continues to compute locomotive health as long as there are health event messages in the FIFO processing queue. Further still, updated locomotive health data may be communicated to locomotive management/planning application(s) on a real-time basis to provide actionable intelligence for the locomotive management/planning application(s) with regard to how locomotives should be assigned to train consists.

With the example embodiments described herein, it is believed that improvements in train operations, including large-scale train operations, are achieved.

Various aspects of the embodiments are substantially shown in and/or described in connection with at least one of the following drawings as set forth more completely in the claims.

These and other advantages, aspects, and novel features of the present disclosure, as well as details of illustrated embodiments thereof, will be more fully understood from the following description and drawings.

BRIEF DESCRIPTION OF DRAWINGS

The drawings described herein are for illustrative purposes only of selected embodiments and are not intended to limit the scope of the present disclosure.

FIG. 4 depicts an example locomotive health indication data structure in accordance with various embodiments.

FIG. 6 depicts an example logic mapping table for defining locomotive health based on various factors in accordance with various embodiments.

FIG. 7 depicts an example locomotive health condition (LHC) attribute definition data structure in accordance with various embodiments.

FIG. 8 depicts an example LHC attribute value definition data structure in accordance with various embodiments.

FIG. 9 depicts an example LHC health data structure in accordance with various embodiments.

FIG. 10 depicts an example locomotive health reason source association data structure in accordance with various embodiments.

FIG. 11 depicts an example locomotive health reason source data structure in association with various embodiments.

FIG. 12 depicts an example defect source data structure in accordance with various embodiments.

FIG. 13 depicts an example locomotive health inspection source data structure in accordance with various embodiments.

FIG. 14 depicts an example user interface for a search function of a locomotive health calculator application in accordance with various embodiments.

FIG. 15 depicts an example user interface for a locomotive health details screen of a locomotive health calculator application in accordance with various embodiments.

FIG. 16A depicts an example user interface for a locomotive management application in accordance with various embodiments.

FIG. 16B depicts a portion of the user interface of FIG. 16(a) including a detailed view of a locomotive health data display.

FIG. 17 depicts an example user interface for a locomotive planning application in accordance with various embodiments.

FIGS. 18A-D depict an example user interface for a locomotive management application which provides status information for various locomotives in accordance with various embodiments.

Figure 1:
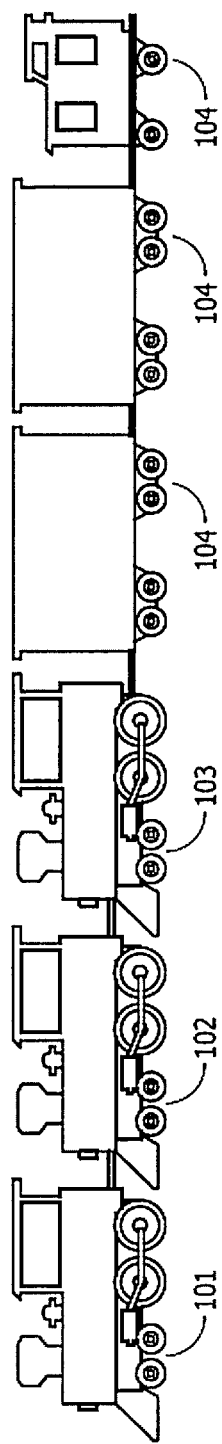
FIG. 1 depicts an example train consist.

Reference characters in the written specification indicate corresponding items shown throughout the drawings.

DETAILED DESCRIPTION

An illustrative, but non-limiting, embodiment of a train consist is shown in FIG. 1. The train consist comprises one or more locomotives to provide power for driving the train consist. For example, the train consist may comprise a lead locomotive 101, a second locomotive 102, a third locomotive 103, and a plurality of cars 104. It should be understood that more or fewer locomotives may be included in a train consist and that more or fewer cars may be included in the train consist illustrated by FIG. 1. It should be further understood that one or more cars may be interleaved between locomotives if desired. A train consist may comprise any number or combinations of locomotives and/or cars. In one embodiment, the train consist comprises at least one locomotive.

One of the challenges faced by an operator of train consists is selecting which locomotives should be included in a train consist (and where each of the one or more selected locomotives should be included within the train consist (e.g., lead locomotive, trailing locomotive, etc.)). Various aspects of the disclosure provide for better techniques of tracking and quantifying locomotive health to help support the management/planning process for a rail transportation company so that locomotive health may be better taken into consideration when assigning locomotives to train consists. The various aspects of the present disclosure describe how locomotive data about locomotives may be processed to monitor and compute locomotive health data to facilitate decision-making of this type. As used herein, "locomotive health" refers to a characteristic of a locomotive that reflects or identifies the locomotive's operational capabilities, operational condition, operational status, and/or needs for maintenance and/or repair. Given that locomotives must travel long distances through many types of terrain and in all types of weather conditions, the health of a given locomotive is expected to fluctuate over time. Locomotive health computations for some embodiments may be performed for a plurality of locomotives in a locomotive fleet to provide a systematically uniform and standardized health assessment of locomotives across such a fleet. Furthermore, the computed locomotive health data may comprise a plurality of different health attributes, such as an overall health attribute, a power level attribute, a defect severity attribute, a trail only attribute, and/or a health reason attribute.

Figure 2A:
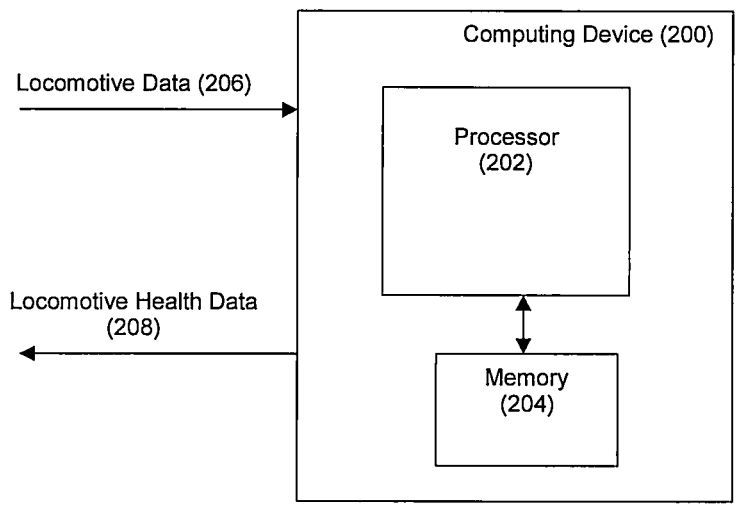
FIG. 2A depicts an example computing device configured to calculate locomotive health data in accordance with various embodiments.

FIG. 2A depicts an example computing device 200, where the computing device 200 includes a processor 202 and memory 204. The memory 204 may be configured to store processor-executable instructions, where these instructions define processing logic for execution by the processor to compute locomotive health data 206 based on locomotive data 208. The locomotive data 208 may be data about any of a number of aspects of a locomotive, including but not limited to locomotive defect data, locomotive inspection data, and/or locomotive status data.

The processor 202 may be any type processor with sufficient computational capabilities to implement the processing operations described herein. It should be understood that processor 202 may comprise multiple processors, optionally distributed via a network. The programming instructions for implementing the processing logic executed by the processor 202 may be resident on a non-transitory computer-readable storage medium (e.g., memory 204) for access and execution by the processor 202. It should also be understood that the memory 204 may comprise multiple memory devices, which may be multiple distributed memory devices and/or memory devices of different types, including but not limited to one or more hard drives, random access memories (RAMs), removable storage media such as flash drives, optical media, and the like, etc. The memory 204 may also store a plurality of data structures that reflect the computed locomotive health. A data structure may be a physical manifestation of information organized within a computing system. Examples of data structures may include data files, records, tables, arrays, trees, objects, and the like.

Figure 2B:
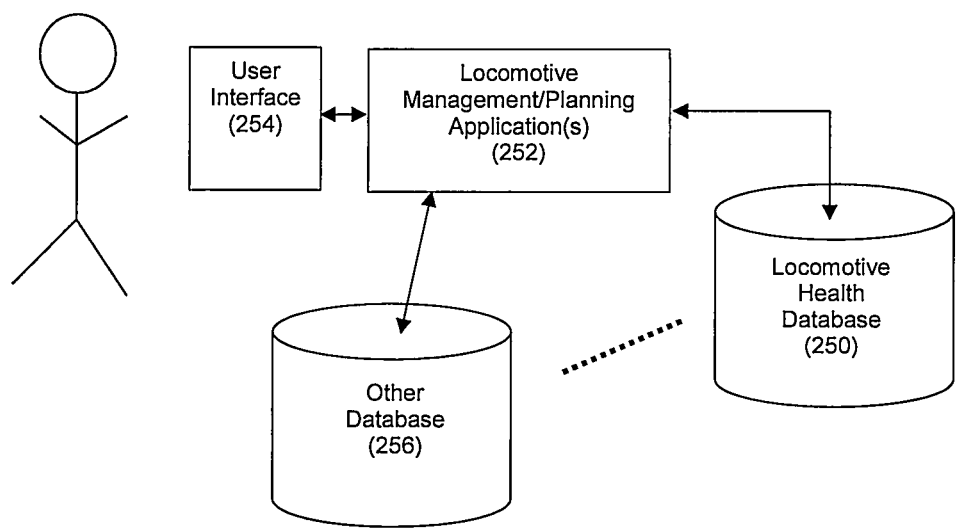
FIG. 2B depicts how the locomotive health data of an example embodiment may be leveraged by one or more locomotive management/planning applications to facilitate operations.

The computing device 200 may be a computer system or network of a rail transportation company. As such, the processor 202 and memory 204 that implement locomotive health calculations may be members of a larger system of computing devices related to locomotive management. For example, such a computer system/network may be associated with one or more locomotive management/planning applications 252 as illustratively described in FIG. 2B. Locomotive health data may be computed by the processor 202 and may be stored in a database 250 for access by the locomotive management/planning application(s) 252. Such a database 250 may be stored in memory 204. Through access to database 250, the locomotive management/planning application(s) 252 may use the locomotive health data stored in the database 250 to facilitate decision-making about how locomotives are to be managed and train consists are planned. For example, locomotive health data may be communicated to users of the locomotive management/planning application 252 via a user interface 254. Furthermore, it should be understood that the locomotive management/planning application(s) 252 may also access other sources of data such as database 256 to facilitate operations. Example locomotive management/planning applications 252 are described below with reference to FIGS. 16A-18.

It should be understood that the computing device 200 may perform locomotive health computations on a large pool of locomotives (e.g., hundreds to thousands of different locomotives, which may be distributed across a national or international rail network) using health metrics that are standardized across the locomotive pool, thus providing locomotive management/planning application(s) with a common source of standardized information regarding locomotive health.

Figure 3A:
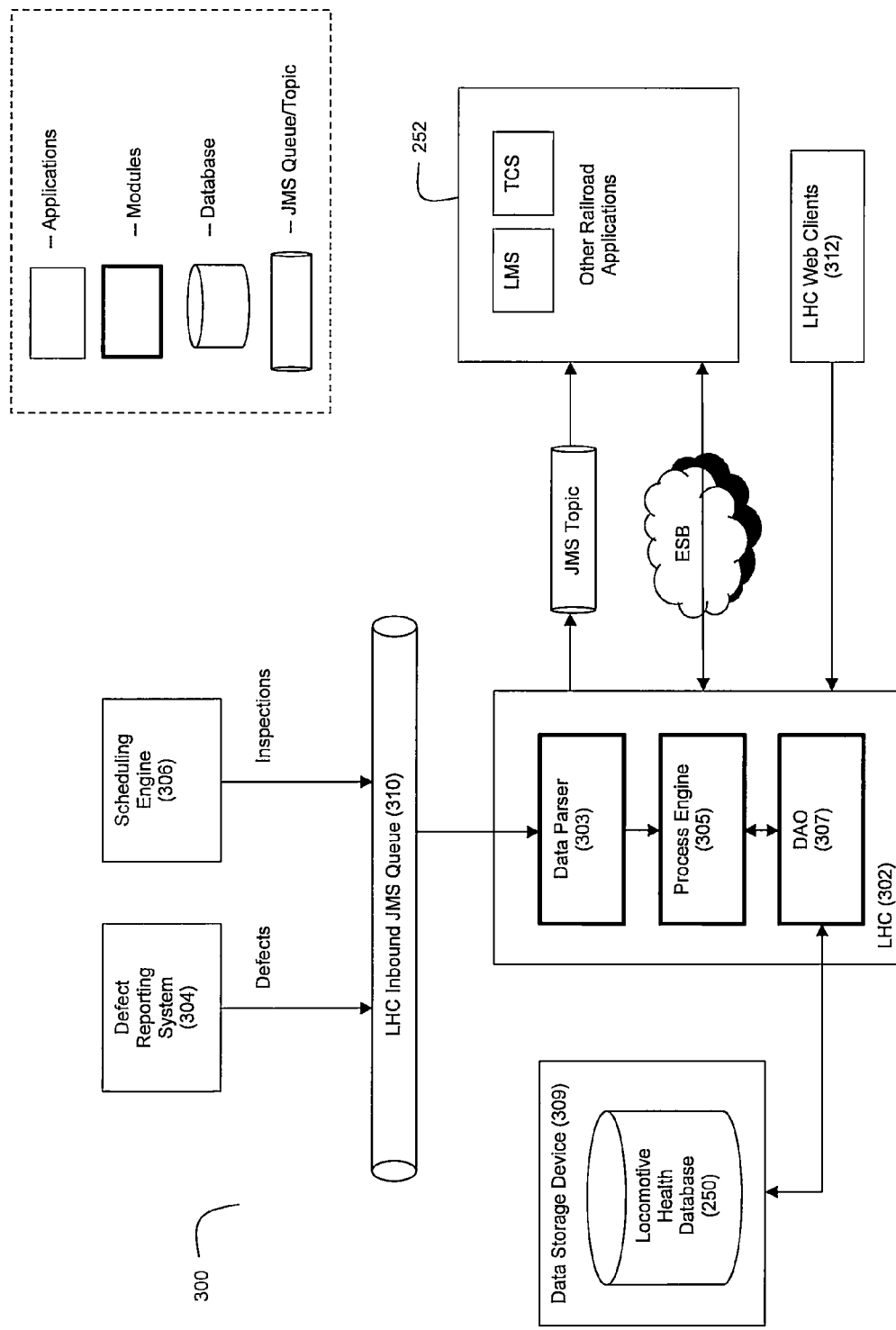
FIG. 3A depicts an example computer system architecture for calculating locomotive health in accordance with various embodiments.

FIG. 3A depicts an example computer system architecture 300 for calculating locomotive health. A locomotive health calculator (LHC) 302 is configured to implement process flows for computing health data for a locomotive using a plurality of input parameters. Examples of input parameters that may be processed to compute locomotive health include locomotive defect data and locomotive inspection data. In the example of FIG. 3A, the LHC 302 is configured to receive such data from a number of different sources.

For example, a defect reporting system (DRS) 304 for locomotives may be configured to track and maintain defect data for a fleet of locomotives. Thus, personnel may report observed or detected defect occurrences for locomotives and add associated defect occurrence(s) data to a defects database via DRS 304. The DRS 304 may be configured to create a plurality of defect data structures that describe the locomotive defect occurrences, and the DRS 304 may store such defect data structures in a database. Each defect data structure may comprise a plurality of data components that serve to describe a locomotive defect occurrence (e.g., a type of defect for the defect occurrence, a status for the defect occurrence (e.g., open or closed), etc.). These defect data structures may then be accessed for analysis by the LHC 302 to assess locomotive health. Examples of locomotive defect types that may be tracked via DRS 304 include wheel defects, engine defects, electrical system defects, cab/body defects, HVAC defects, etc.

As another example, the computer system architecture 300 may include a scheduling engine 306 for locomotive inspections. The scheduling engine 306 may be configured to track and maintain inspection data for locomotives and add such inspection data to an inspections database included within the scheduling engine 306. The inspection data may be stored in the inspections database as a plurality of inspection data structures. Each inspection data structure may comprise a plurality of data components that serve to describe an inspection for a locomotive (e.g., a type of inspection, a date for the inspection, etc.). It should be understood that the inspection data structures may describe future inspections. Thus, the inspection data may include data indicating when inspections are scheduled for each locomotive. These inspection data structures may then be accessed for analysis by the LHC 302 to assess locomotive health. It should be understood that such inspections may be self-inspections and/or inspections pursuant to regulatory authorities such as the Federal Railroad Administration (FRA). Examples of federal inspections that may be tracked and scheduled via scheduling engine 306 may include various Federal periodic inspections and air brake change inspections, The LHC 302 may be configured to automatically calculate locomotive health for a locomotive in response to detecting new defect data and/or inspection data for a locomotive from any of the DRS 304 and/or scheduling engine 306. In a powerful example embodiment, the system 300 may compute updated locomotive health values in a real-time manner as new defect or inspection data becomes available. This real-time capability may provide managers and planners who are tasked with assigning locomotives to trains and assigning power to such assigned locomotives greater insights into locomotive health to thereby yield improved train operations, When a defect occurrence for a locomotive gets created, closed, deferred, or deleted in the DRS 304, the DRS 304 may be configured to post a message on the LHC inbound queue 310 to trigger a health calculation for that locomotive. A defect occurrence for a locomotive gets created in the DRS 304 when it is first added to a defects database by the DRS 304. Upon creation, this defect occurrence is expected to have a status of "open" to indicate that the defect occurrence has not yet been ameliorated. When the defect occurrence is later ameliorated, the DRS 304 may update the defects database to indicate that the defect occurrence is "closed". A defect occurrence may be "deferred" when repair shop personnel evaluate the locomotive and choose not to fix the defect, and a defect occurrence may be "deleted" when repair shop personnel evaluate the locomotive and conclude that the defect is not present. The message posted to queue 310 may include the relevant defect occurrence data (or a pointer to such defect occurrence data) for use by the LHC 302 to calculate locomotive health. Similarly, the availability of new inspection data for a locomotive may cause the scheduling engine 306 to post a message on the LHC inbound queue 310 to trigger a health calculation for that locomotive. This message may include the relevant inspection data (or a pointer to such inspection data) for use by the LHC 302 to calculate locomotive health.

Figure 3B:
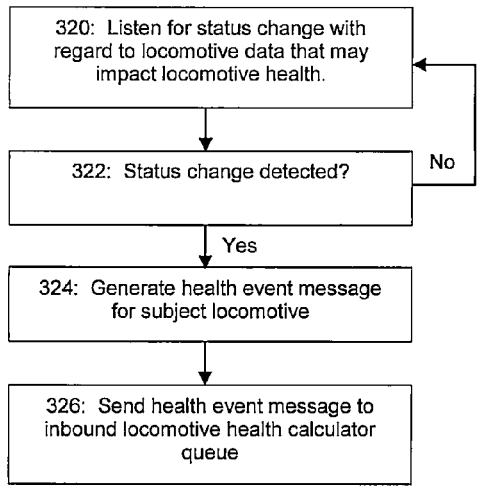
FIGS. 3B-D depict example operational flow diagrams of methods that support a real-time triggering of locomotive health computations and notifications regarding updated locomotive health.

For example. FIG. 3B depicts an example process flow for code that may be executed by an application such as DRS 304 or scheduling engine 306 to provide health relevant information to the LHC 302 on a real-time basis. At step 320, the code listens for a status change with regard to locomotive data that may impact locomotive health. For example, the creation of a new open defect by DRS 304 may be monitored at step 320. Similarly, step 320 may check for the closing of a previously open defect by DRS 304 or the change in severity of an open defect within the DRS 304. As another example, a newly scheduled inspection by scheduling engine 306 may be monitored at step 320. As yet another example, step 320 may monitor the upcoming inspections based on the current date to identify which inspections are past due or are upcoming and have crossed a threshold in relation to imminence such that locomotive health may be impacted (e.g., identifying upcoming inspections that have are now within the next 5 days, the inspections that are now within the next 6-15 days, etc.). Additional examples of triggers that may be monitored at step 320 may include whether mileage thresholds for locomotives are reached and whether certain maintenance thresholds for locomotives are reached (which may include maintenance events that are triggered by mileage thresholds). Step 320 can continuously execute so that the code may detect health-impactful changes in locomotive data as soon as such data becomes available.

If such a status change is detected (step 322), then a health event message is generated at step 324. This health event message may identify the locomotive to which it pertains and include health relevant information for that locomotive (such as information about the triggering defect or triggering inspection). At step 326, the health event message is sent to the LHC 302 (for example, by posting the health event message in inbound queue 310 shown by FIG. 3A). The LHC 302 may then be configured to read health event messages out of queue 310 on a first in first out (FIFO) basis, and these health event messages may serve as a trigger for the LHC 302 to compute an updated locomotive health for a locomotive that is the subject of a health event message.

Figure 3C:
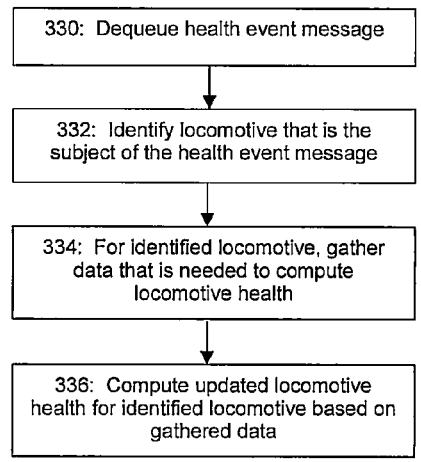

FIG. 3C shows an example process flow that may be executed by LHC 302 with regard to health event messages in queue 310. At step 310, the LHC dequeues a health event message. At step 332, the LHC reads the health event message and identifies the locomotive that is the subject of the health event message. Data parser 303 may be called in order for the LHC to be able to read the health event message, as explained below. Next, at step 334, the LHC gathers the data about the identified locomotive that is needed to compute locomotive health. This data may be wholly present within the dequeued health message, but it should be understood that step 334 may also include retrieving locomotive data from other data sources. Then, at step 336, the LHC computes updated locomotive health for the identified locomotive based on the data gathered at step 336. Examples for how step 336 may be executed are described below in connection with FIGS. 5A-E and FIG. 6.

Figure 3D:
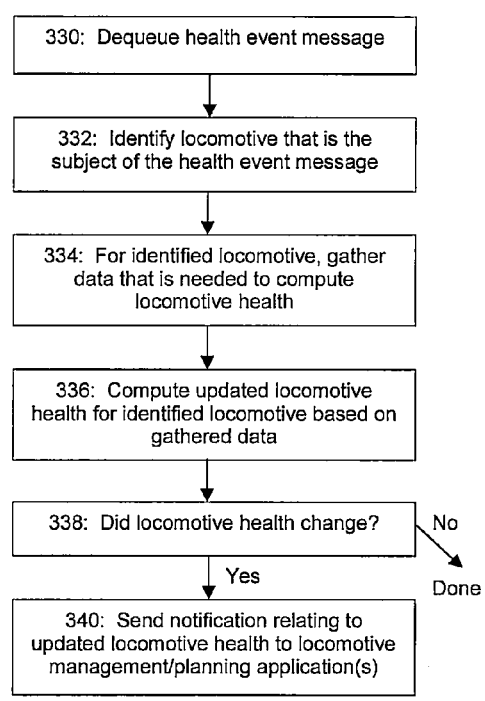

With an example embodiment, an additional enhancement may be real-time notification of locomotive health changes to downstream consuming applications so that the LHC 302 may be integrated within system 300 to provide timely health information from end-to-end. FIG. 3D shows an example process flow in this regard. Steps 330-336 in FIG. 3D may operate as described in connection with FIG. 3C. After updated locomotive health is computed at step 336, the system may check whether the updated locomotive health for the locomotive is a change in locomotive health for that locomotive (i.e., is the updated locomotive health value different from its immediately previous value?). If so, a notification is sent at step 340 to any downstream applications such as locomotive management/planning applications that would benefit from the updated locomotive health data. It should be understood that steps 338 and 340 may be performed by the LHC 302 or another component within system 300.

Figure 3E:
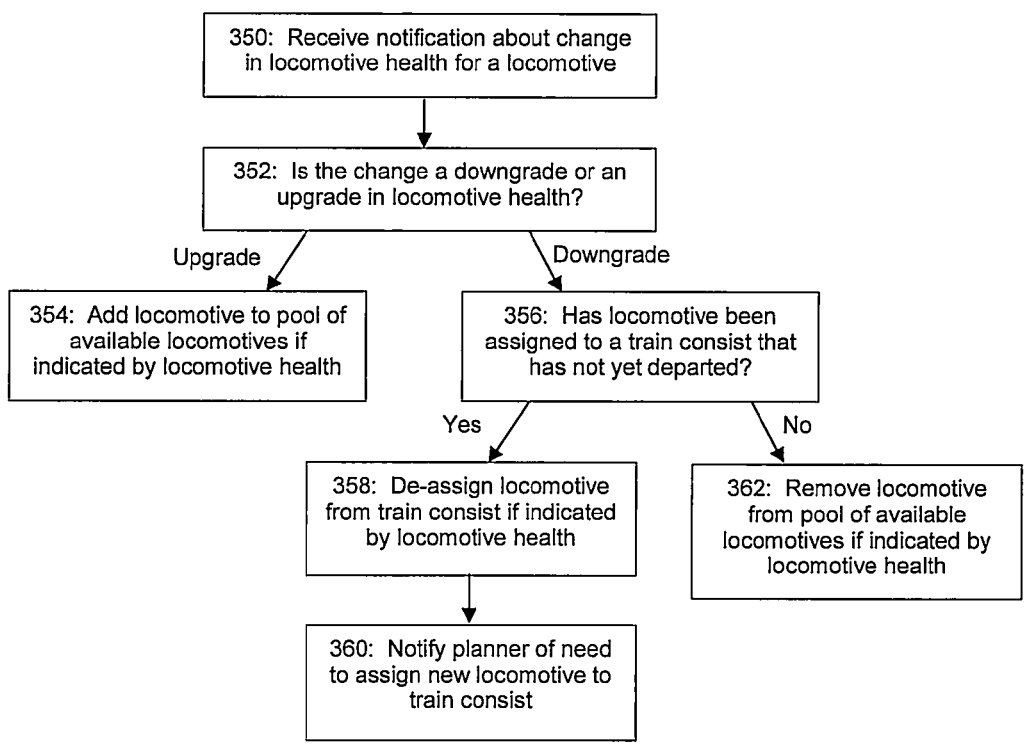
FIG. 3E depicts an example operational flow diagram of a method whereby a locomotive planning/management application may leverage real-time updates in locomotive health to facilitate decision-making regarding locomotive assignments.

FIG. 3E depicts an example process flow whereby a locomotive planning/management application may leverage real-time updates in locomotive health to facilitate decision-making regarding locomotive assignments. At step 350, the application receives the notification about the change in locomotive health for a locomotive. At step 352, the application checks whether the new locomotive health is a health upgrade or a health downgrade.

If the new locomotive health is an upgrade, the subject locomotive may be added to the pool of available locomotives if indicated by the new locomotive health (step 354). For example, if the prior locomotive health for the subject locomotive was sufficiently low that the locomotive was not available to power a train (for example, due to an open defect that qualified as severe), but the new locomotive health has changed because the defect was ameliorated, this may mean that the subject locomotive is now available for work, and step 354 may be configured to detect such a situation and automatically add the subject locomotive to the available pool.

If the new locomotive health is a downgrade, then the application may determine whether the subject locomotive has been assigned to a train consist that has not yet departed from a station (step 356). If the locomotive has been assigned to such a train consist, then at step 358 the application may automatically de-assign the locomotive from the train consist if indicated by the new locomotive health. For example, if a new open defect with a severe rating was just opened for a previously healthy locomotive, step 358 may provide an automated mechanism for de-assigning the locomotive from the train consist in a timely fashion on a real-time basis with respect to when the open defect was first created within the system 300. Next, at step 360, a locomotive manager or planner may be notified of the need to assign a new locomotive to the subject train consist by virtue of the de-assignment performed at step 358.

If step 356 results in a determination that the downgraded locomotive has not yet been assigned to a train consist that has not yet departed a station, then at step 362 the application may remove the downgraded locomotive from the pool of available locomotives if indicated by the new locomotive health. For example, if a previously healthy locomotive is downgraded to the point where it is no longer suitable for powering a train, step 362 may automatically remove that locomotive from the pool of locomotives that are available to a manager or planner for assignment to a train consist.

Thus, as shown by the example embodiments of FIGS. 3A-E, the LHC 302 may serve as a real-time bridge for interconnecting and integrating disparate components of a rail transportation company's computer system 300, such as applications that manage locomotive repair management and inspection scheduling (e.g., DRS 304 and scheduling engine 306) and applications that manage how locomotives are assigned to trains (e.g., applications 252).

Returning to FIG. 3A, the LHC may comprise a data parser 303, a process engine 305, and a data access object (DAO) component 307.

The data parser 303 may be configured to read and interpret these messages to extract the data needed for locomotive health calculation. In instances where different messages in queue 310 may exhibit different data formats, the data parser 303 may include rules for decoding the different messages to extract the relevant data. For example, the DRS 304 may generate messages in a first format and the scheduling engine 306 may generate messages in a second format. These various messages may include an identifier field that serves to identify which of these message sources generated a subject message. Different code sections of the data parser 303 may be programmed with rules for decoding the message format of each message source, such that a first code section may define rules for decoding the messages from DRS 304 and a second code section may define rules for decoding the messages from scheduling engine 306 (and so on for other possible sources of messages). These code sections may be mapped to different source identifiers in the source identifier fields of the queued messages. The data parser 303, in turn, may read the source identifier field in the message and jump to the appropriate code section for execution in order to decode the subject message. As such, the data parser 303 may be configured to render the LHC 302 interoperable with a number of different legacy applications that generate data relevant to locomotive health.

Figure 5A:
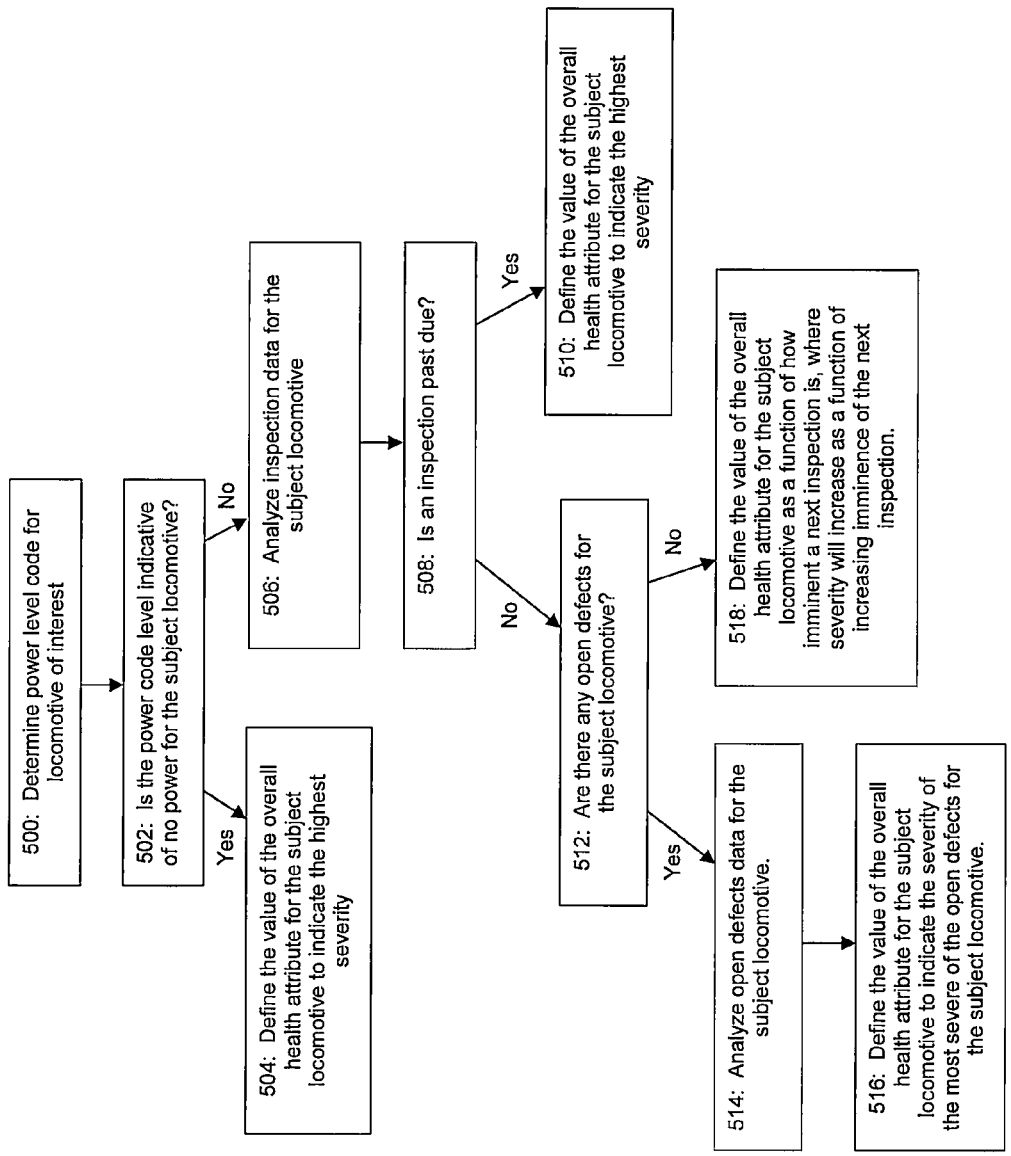
FIG. 5A is an example operational flow diagram of a method for computing an overall health attribute indicator for a locomotive.

The process engine 305 may be configured to execute instructions that embody process flows for computing locomotive health. Examples of such process flows are illustrated by FIGS. 5A-6. As explained below with reference to example embodiments characterized by FIG. 4, the computed locomotive health data may take the form of a data structure comprising a plurality of locomotive health attributes and corresponding indicators for those attributes.

The DAO component 307 may then be configured to update a locomotive health database 250 in a data storage device 309 with the newly computed locomotive health data.

FIG. 4 depicts an example table of locomotive health attributes and their allowed values. The allowed values may serve as indicators that characterize or quantify their corresponding locomotive health attributes for subject locomotives. In the example of FIG. 4, five different health attributes are used to describe locomotive health. However, it should be understood that more, fewer, and/or different health attributes may be used if desired. A locomotive health data structure may be stored within database 250 through associations between the values for different health attributes for a particular locomotive.

Item 1 of the FIG. 4 table may serve as an overall health attribute for the locomotive. The values for the overall health attribute may be designed to communicate meaningful distinctions in health to managers who are tasked with jobs such as choosing which locomotives should be assigned to train consists. In the example of FIG. 4, the value for the overall health attribute may be expressed as a color code indicative of the severity of the locomotive's health. For example, green (as represented by the character "G") may be used to indicate the lowest severity (i.e., most healthy), white (as represented by the character "W") may be used to indicate the second lowest severity, yellow (as represented by the character "Y") may be used to indicate medium severity, red (as represented by the character "R") may be used to indicate the second highest severity, and blue (as represented by the character "B") may be used to indicate the highest severity (i.e., most unhealthy). With these examples, (1) green may signify that the locomotive is available without qualifications. (2) white may signify that the locomotive is available for powering a train, but it should be moved to a repair shop at the next convenient opportunity, (3) yellow may signify that the locomotive should not be removed from a train if the train is already moving, but such locomotive should not be added to a new train to provide locomotive power, (4) red may signify that the locomotive should not be used to power a train and should be placed in a repair shop at the earliest opportunity, and (5) blue may signify that the locomotive is deemed currently incapable of providing locomotive power and should not be used to power a train. It should be understood that these modes of expressing overall locomotive health are examples only. For example, a mode of expression other than color coding may be used (e.g., a number scale, a letter grade scale, a descriptive scale, etc.). Further still, more or fewer than five levels of gradation for expressing overall locomotive health may be used. As described below in an example embodiment with respect to FIG. 5A, the overall health attribute for a locomotive may be affected by factors such as the defects and inspections that may be applicable to the locomotive.

Item 2 of the FIG. 4 table may serve as a power level health attribute for the locomotive. In the example of FIG. 4, the value for this power level health attribute may be expressed as a power level code indicative of whether the locomotive is deemed to not be capable of operating under power, i.e., a "no power" mode ("0"), whether the locomotive is only capable of operating under partial power ("50"), or whether the locomotive is deemed capable of operating under full power ("100"). It should be understood that these modes of expressing power level health for a locomotive are examples only. For example, additional levels of gradation may be used (e.g., 4 levels rather than 3 levels), and different modes of expressing such levels may be used.

Item 3 of the FIG. 4 table may serve as a trail only health attribute for the locomotive. In the example table of FIG. 4, the value for this trail only health attribute serves to indicate whether the subject locomotive is limited to usage as a trail locomotive (i.e., it should not be used as a lead locomotive in a locomotive consist). This attribute may take the values of "Y" or "yes" (to indicate that the subject locomotive should only be used as a trail locomotive), "N" or "no" (to indicate that the subject locomotive is not limited to only trail usage), or "N/A" or "not applicable". The N/A value for the trail only attribute may be used for locomotives whose power level health attribute value is "0" while the Y and N trail only attribute values may be used for locomotives whose power level health attribute value is "100" or "50". It should be understood that these modes of expressing trail only health for a locomotive are examples only. For example, the N/A trail only health attribute value may optionally be eliminated such that all N/A's become N's.

Item 4 of the FIG. 4 table may serve as a defect severity health attribute for the locomotive. The value for this defect severity health attribute may serve to indicate the severity level of any defects that are known to be applicable to a locomotive. In the example table of FIG. 4, the defect severity attribute may be expressed as a color code indicative of defect severity. For example, white (as represented by the character "W") may be used to indicate the lowest severity, yellow (as represented by the character "Y") may be used to indicate medium severity, and red (as represented by the character "R") may be used to indicate the highest severity. These color codings may signify the same effects as those discussed above in connection with the overall health attribute. Furthermore, a value such as "N" or "No" may be used to indicate no defect severity (e.g., if there are no known defects for a locomotive). It should be understood that these modes of expressing defect severity health for a locomotive are examples only. For example, as noted with the overall health attribute, a mode of expression other than color coding may be used (e.g., a number scale, a letter grade scale, a descriptive scale, etc.). Further still, more or fewer than four levels of gradation for expressing defect severity health may be used.

Item 5 of the FIG. 4 table may serve as a health reason attribute for the locomotive. The value for this health reason attribute may serve to indicate a major contributing factor to the locomotive's overall health attribute. In the example of FIG. 4, the health reason attribute may be expressed as data indicative of whether a major contributing factor to the locomotive's overall health indicator was the (1) inspection data (e.g., an "F" code or "FRA Inspection Due" description), (2) defect data (e.g., a "D" code or "Defect" description), or (3) combination of inspection data and defect data (e.g., a "F, D" code or "FRA Inspection Due, Defect" description). As such, the health reason attribute for a locomotive may serve as additional explanatory information about that locomotive's overall health attribute. It should be understood that these modes of expressing health reasons for a locomotive are examples only.

FIG. 5A depicts an example process flow to be performed by processor 202 when processor 202 executes programmed instructions to compute a value for an overall health attribute with respect to a locomotive. Performance of the FIG. 5A process flow may be triggered by the processor 202 reading a message from queue 310 that includes data indicating a need to re-calculate the health of a particular locomotive (e.g., a new defect occurrence has been reported for a locomotive, a formerly open defect occurrence for a locomotive has been closed, a certain mileage or maintenance trigger threshold has been reached, etc.).

At step 500, the processor 202 determines a power level data for a locomotive of interest. This power level data may be retrieved from a database that stores data describing various locomotive characteristics or it may be retrieved from a message on queue 310 if the message includes such data. This power level data may be a power level code associated with the subject locomotive such as the type described in connection with FIG. 4 (e.g., power level codes to express full power, partial power, and no power). At step 502, the processor 202 checks if the power level data is indicative of the subject locomotive having no power. If the power level data indicates that the subject locomotive has no power, then the processor defines the value of the overall health attribute for the subject locomotive to indicate the highest severity (step 504).

If the power level data indicates that the subject locomotive does have power, then the processor 202 proceeds to step 506 where it analyzes inspection data for the subject locomotive. This inspection data may be retrieved from a database of locomotive inspection data (e.g., such as that maintained by scheduling engine 306) or it may be extracted from an inspection data message on queue 310. At step 508, the processor 202 checks whether the analyzed inspection data indicates that an inspection is past due for the subject locomotive. If step 508 indicates that an inspection is past due for the subject locomotive, then the processor at step 510 defines the value of the overall health attribute for the subject locomotive to indicate the highest severity.

If the power level data indicates that the subject locomotive does not have an overdue inspection, then the processor 202 proceeds to step 512 where it considers the defect data for the subject locomotive. This defect data may be retrieved from a database of locomotive defect data (e.g., such as that maintained by DRS 304) or it may be extracted from a defect data message on queue 310. At step 512, the processor checks whether there are any defect occurrences applicable to the subject locomotive that have an open status (i.e., an open defect occurrence).

If there is an open defect occurrence, the processor 202 at step 514 analyzes the open defect occurrence data. In an example embodiment, the defect data may include defect severity data indicative of that defect occurrence's severity. This defect severity data may be of the type described in connection with Item 4 of FIG. 4 (e.g., defect severity values to express white, yellow, and red severities). Then, at step 516, the processor 202 defines the value of the overall health attribute for the subject locomotive to match the most severe of the damage severity values for the open defect occurrence (s) applicable to the subject locomotive. Thus, if there are three open defect occurrences applicable to the subject locomotive, one of the open defect occurrences being a white defect, one being a yellow defect, and the other being a red defect, step 516 would operate to define the overall health for the subject locomotive to match the red severity (where, as discussed in connection with Item 4 of FIG. 4, for this example, the severity progressively increases from white to yellow to red). However, it should be understood that other techniques may be employed to define the value of the overall health attribute in such situations. For example, it may be the case that the defect severity data for a defect is graded based on the seriousness of a particular defect as opposed to the criticalness of such defect to the locomotive itself (e.g., a paint defect on a locomotive being scored with a red severity because the paint damage corresponding to the defect is severe while an engine defect on a locomotive being scored with a yellow severity because the engine problem with the locomotive is intermediate). In such situations one might separately classify how different types of defects influence the overall health attribute value definition operation of step 516 (e.g., continuing with the example, greater weight being applied to defects affecting an aspect of a train deemed critical than to defects deemed minor such as the engine defect having controlling weight over the paint defect).

If step 512 results in a determination that there is not an open defect occurrence for the locomotive, then at step 518, the processor 202 defines the value of the overall health attribute for the subject locomotive as function of how imminent the locomotive's next inspection is (as determined from the analyzed inspection data). In an example embodiment, the severity of the overall health attribute increases as a function of increasing imminence of the locomotive's next inspection. For example, for a locomotive meeting the qualifying criteria of step 518, where the next inspection is one month away, that locomotive's defined overall health attribute value would have a higher severity than such a locomotive where the next inspection is ten months away. However, it should be understood that other metrics may be used to define the overall health of such locomotives at step 518. For example, the nature of the imminent inspection may be taken into consideration and/or a defect history of the subject locomotive may be taken into consideration.

Figure 5B:
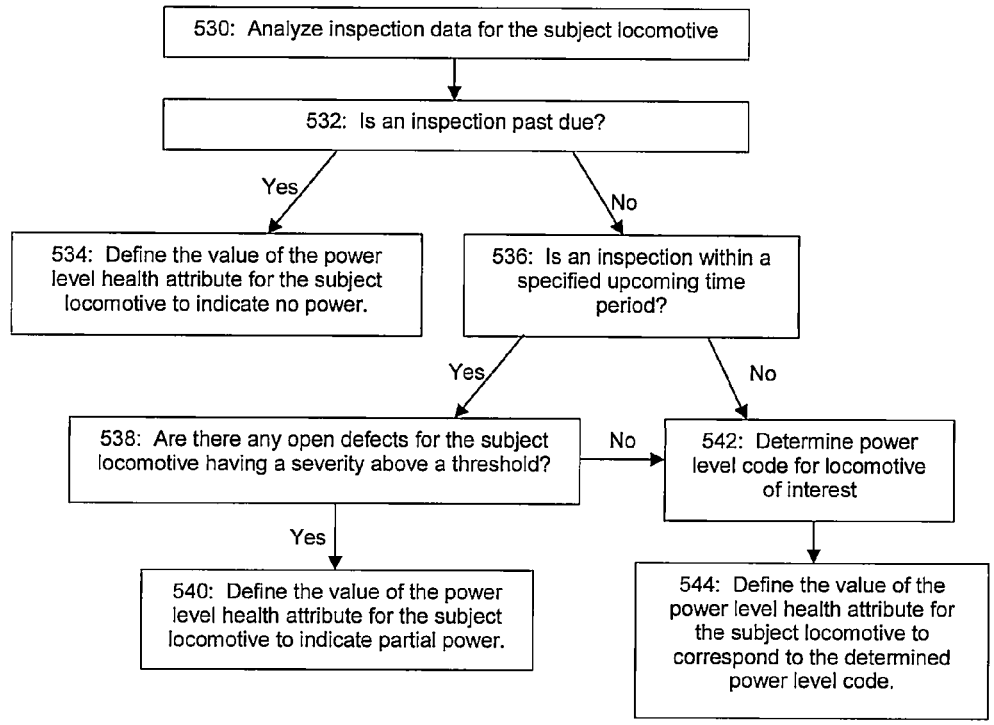
FIG. 5B is an example operational flow diagram of a method for computing a power health attribute indicator for a locomotive.

FIG. 5B depicts an example process flow to be performed by processor 202 when processor 202 executes programmed instructions to compute a value for a power level health attribute with respect to a locomotive. Performance of the FIG. 5B process flow may be triggered by the processor 202 reading a message from queue 310 that includes data indicating a need to re-calculate the health of a particular locomotive (e.g., a new defect occurrence has been reported for a locomotive, a formerly open defect occurrence for a locomotive has been closed, a certain mileage or maintenance trigger threshold has been reached, etc.).

At step 530, the processor 202 analyzes inspection data for the subject locomotive. As noted, this inspection data may come from a database of such data or a message from the queue 310. At step 532, the processor 202 determines whether an inspection is past due for the locomotive. If so, the value of the power level health attribute for the locomotive is defined to indicate no power (step 534). By doing so, the system is able to prevent locomotives with past due inspections from being seen by system users as being available for use in train operations. Otherwise, the processor determines whether an inspection is scheduled within a specified upcoming time period (e.g., within the next 3 days). If there is an inspection within the specified time period, the processor 202 branches to step 538 and determines whether there are any open defects for the subject locomotive having a severity above a threshold (e.g., a red severity or higher). If so, the value of the power level health attribute for the locomotive is defined to indicate partial power (step 540). If there is no upcoming inspection within the specified time period at step 536 or no open defect with the requisite severity at step 538, the processor branches to step 542. At step 542, the processor 202 determines the locomotive's power level data, which may operate similarly to step 500 of FIG. 5A. Then, at step 544, the processor 202 defines the value of the power level health attribute for the subject locomotive such that it matches the power level data for the locomotive determined at step 542. As with the process flow of FIG. 5A, it should be understood that alternate techniques for defining a locomotive's power level health attribute value may be employed.

Figure 5C:
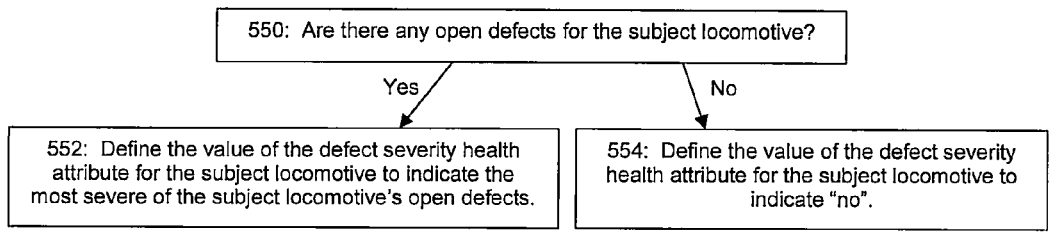
FIG. 5C is an example operational flow diagram of a method for computing a defect severity attribute indicator for a locomotive.

FIG. 5C depicts an example process flow to be performed by processor 202 when processor 202 executes programmed instructions to compute a value for a defect severity health attribute with respect to a locomotive. Performance of the FIG. 5C process flow may be triggered by reading a message from queue 310 that includes data indicating a need to re-calculate the health of a particular locomotive (e.g., a new defect occurrence has been reported for a locomotive, a formerly open defect occurrence for a locomotive has been closed, a certain mileage or maintenance trigger threshold has been reached, etc.).

At step 550, the processor 202 analyzes the defect data for the subject locomotive and determines if there are any open defect occurrences for the locomotive. As noted, this defect data may come from a database of such data or a message from the queue 310. If there is at least one open defect occurrence for the subject locomotive, then the processor 202 defines the value of the defect severity health attribute for the subject locomotive to indicate the severity of the most severe of the open defect occurrence(s) for the subject locomotive (step 552). If there are not any open defect occurrences for the subject locomotive, then the processor 202 defines the value of the defect severity health attribute for the subject locomotive to indicate that no defect severity exists (step 554). As with the process flow of FIGS. 5A-B, it should be understood that alternate techniques for defining a locomotive's defect severity health may be employed.

Figure 5D:
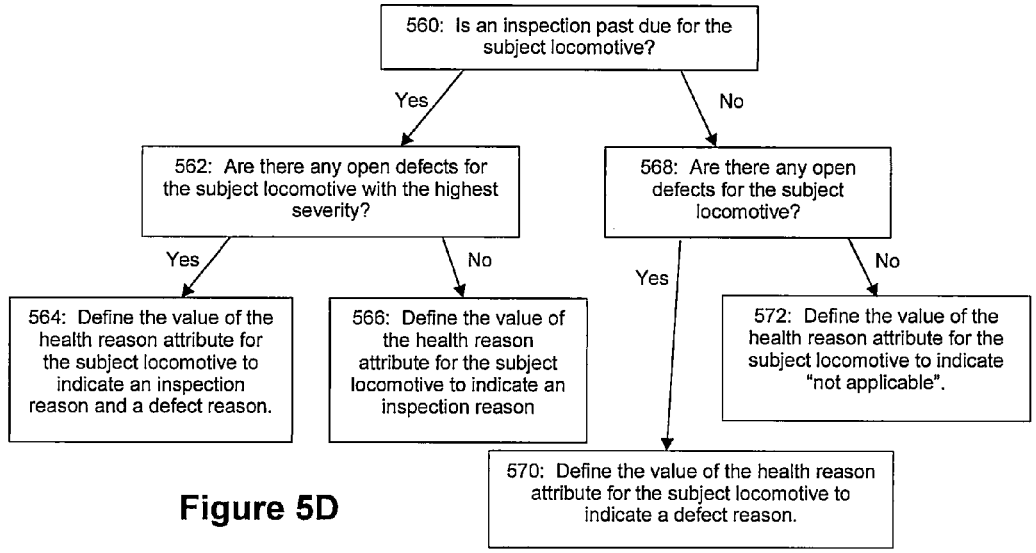
FIG. 5D is an example operational flow diagram of a method for computing a health reason attribute indicator for a locomotive.

FIG. 5D depicts an example process flow to be performed by processor 202 when processor 202 executes programmed instructions to compute a value for a health reason attribute with respect to a locomotive. Performance of the FIG. 5D process flow may be triggered by reading a message from queue 310 that includes data indicating a need to re-calculate the health of a particular locomotive (e.g., a new defect occurrence has been reported for a locomotive, a formerly open defect occurrence for a locomotive has been closed, a certain mileage or maintenance trigger threshold has been reached, etc.).

At step 560, the processor 202 determines whether an inspection is past due for the subject locomotive (as determined after analyzing inspection data for such locomotive).

If an inspection is past due for the locomotive, then the processor 202 may proceed to step 562 to analyze the defect data for such locomotive to determine if there are any open defect occurrences with the highest severity. If there is an open defect occurrence with the highest severity, then the processor 202, at step 564, may define the value of the health reason attribute to indicate both an inspection reason and a defect reason. If there is not an open defect occurrence with the highest severity, then the processor 202, at step 566, may define the value of the health reason attribute to indicate an inspection reason.

If an inspection is not past due for the locomotive, then the processor 202 may proceed to step 568 to analyze the defect data for such locomotive to determine if there are any open defect occurrences. If there is an open defect occurrence, then the processor 202, at step 570, may define the value of the health reason attribute to indicate a defect reason. If there is not an open defect occurrence, then the processor 202, at step 572, may define the value of the health reason attribute to indicate "not applicable" or the like.

As with the process flow of FIGS. 5A-C, it should be understood that alternate techniques for defining a locomotive's health reason attribute value may be employed.

Figure 5E:
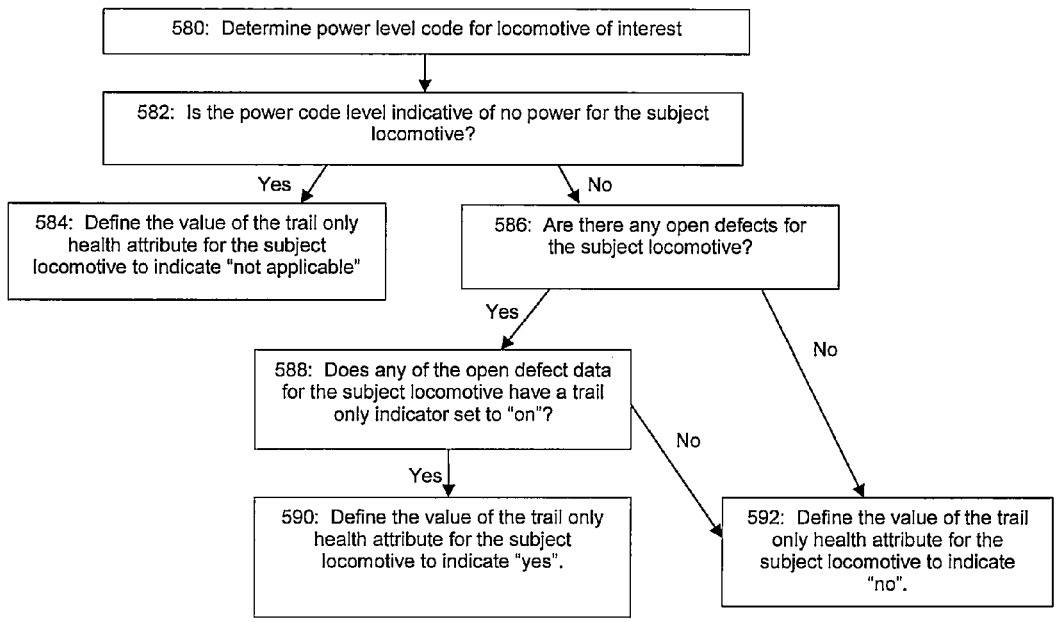
FIG. 5E is an example operational flow diagram of a method for computing a trail only health attribute indicator for a locomotive.
Figure 18A:
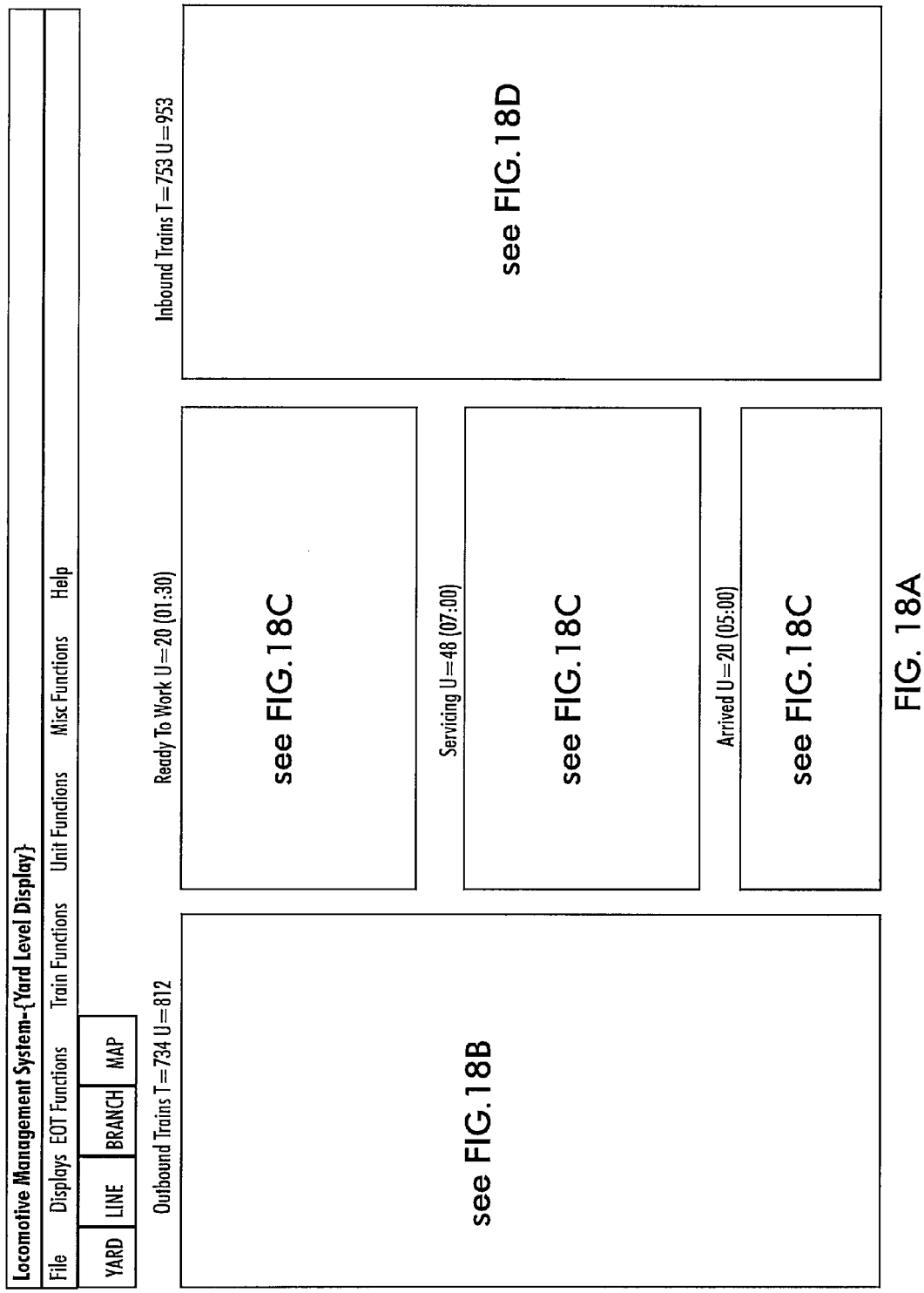
Figure 18B:
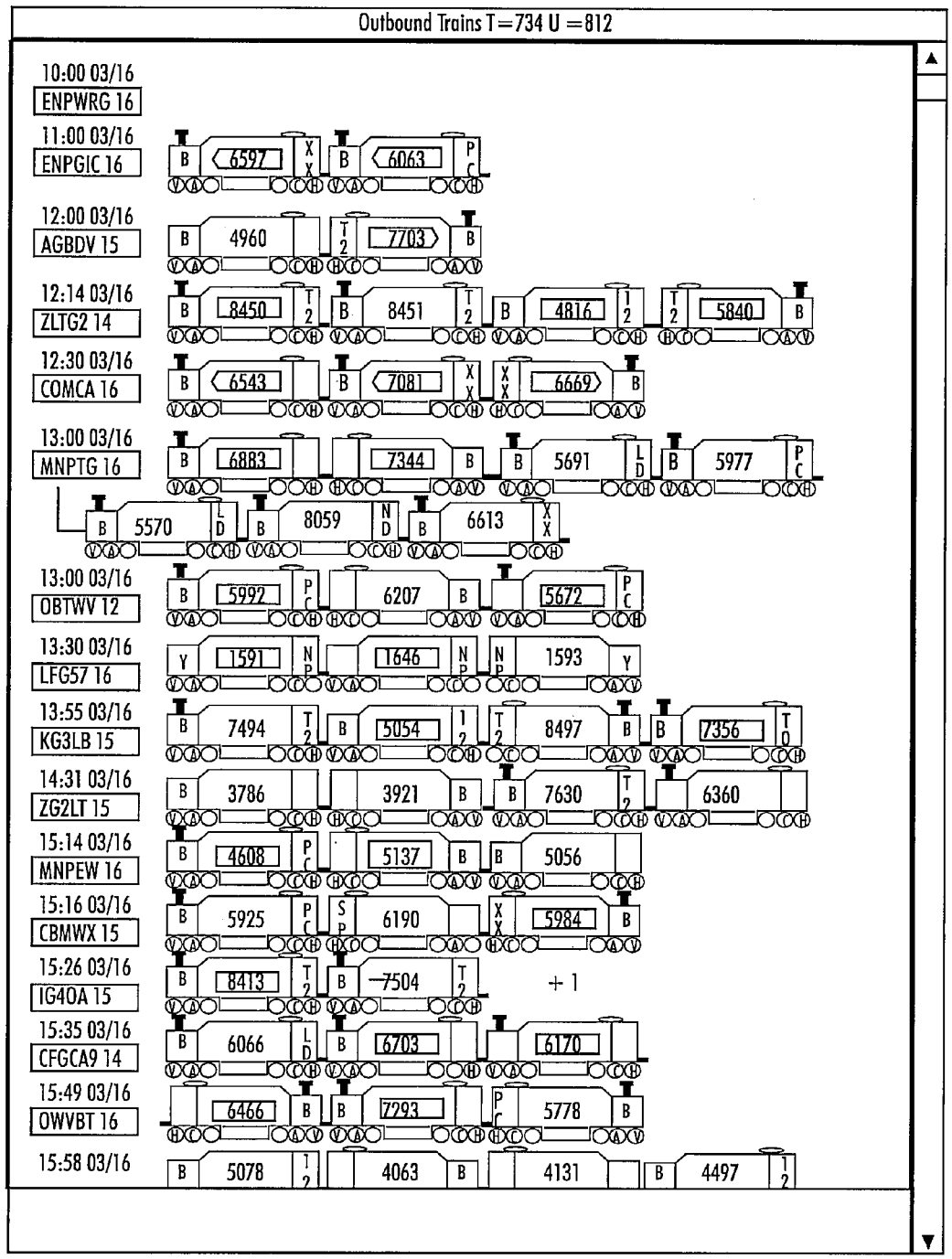
Figure 18D:
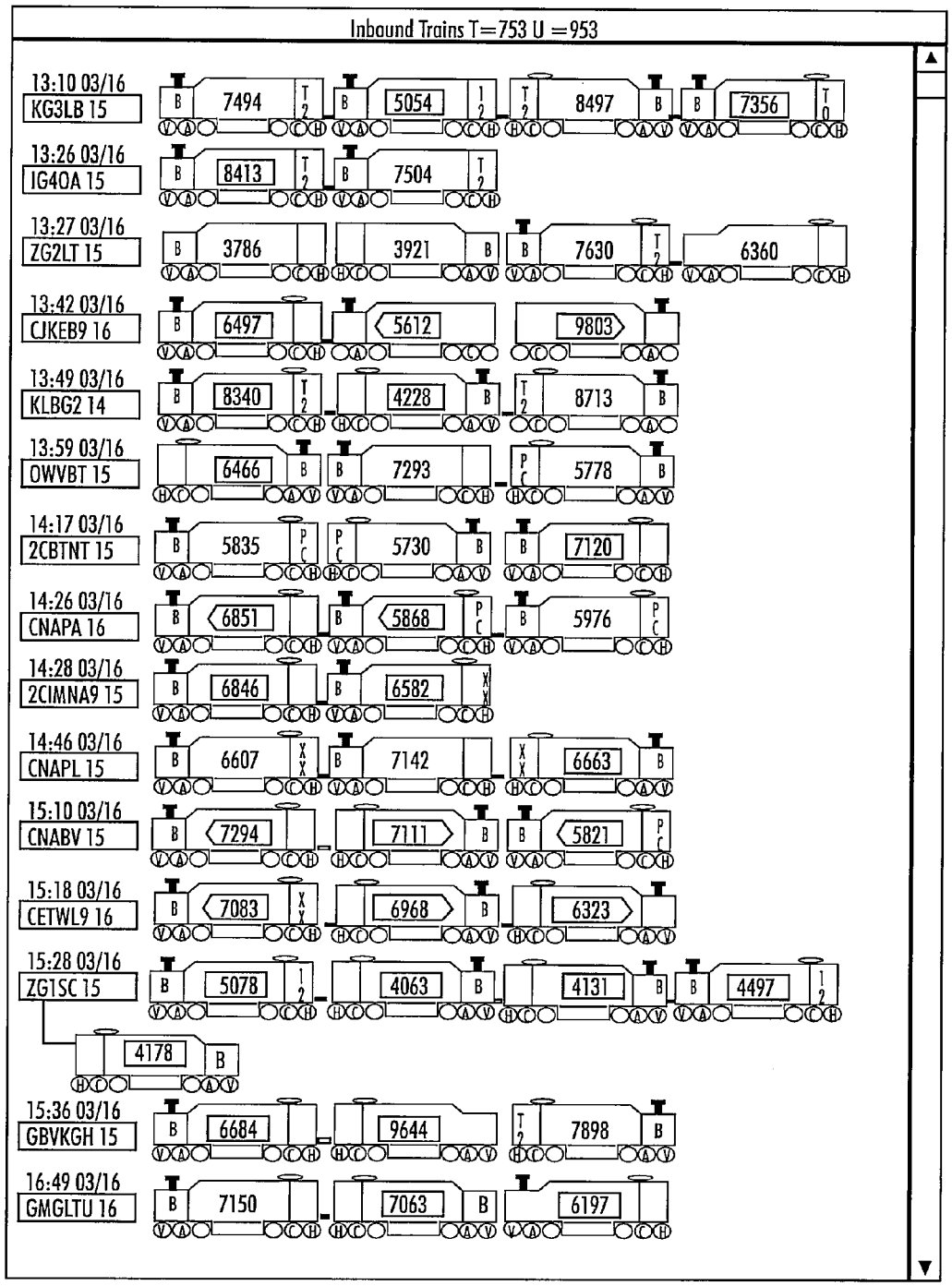

FIG. 5E depicts an example process flow to be performed by processor 202 when processor 202 executes programmed instructions to compute a value for a trail only health attribute with respect to a locomotive. Performance of the FIG. 5E process flow may be triggered by reading a message from queue 310 that includes data indicating a need to re-calculate the health of a particular locomotive (e.g., a new defect occurrence has been reported for a locomotive, a formerly open defect occurrence for a locomotive has been closed, a certain mileage or maintenance trigger threshold has been reached, etc.).

At step 580, the processor 202 determines a power level data for a locomotive of interest. Then, at step 582, the processor 202 checks whether the determined power level is indicative of the subject locomotive having no power. If so, at step 584, the processor defines the value of the trail only health attribute for the subject locomotive to indicate "not applicable". However, it should be understood that the trail only health attribute value in this situation may also be defined as "yes" to indicate that such a locomotive which lacks power may only be used as a trail locomotive. If step 582 results in a determination that the subject locomotive does have power, the process flow proceeds to step 586.

At step 586, the processor 202 analyzes the defect data for the subject locomotive to determine if there are any open defect occurrences. If there is at least one open defect occurrence, then the processor 202 determines whether the defect data for any such open defect occurrence includes an indicator that such open defect occurrence dictates that the locomotive should be relegated to trail only status (step 588). If so, the processor 202 defines the value of the trail only health attribute for the subject locomotive to indicate a "yes" such that the subject locomotive is flagged for use only as a trail locomotive (step 590).

If step 586 results in a determination that the subject locomotive has no open defect occurrences or if step 588 results in a determination that none of the open defect occurrences for the subject locomotive has its trail only status set, then the processor 202 proceeds to step 592 where it defines the value of the trail only health attribute for the subject locomotive to indicate a "no", which means that the subject locomotive is eligible for use in a non-trailing capacity (e.g., as a lead locomotive).

As with the process flow of FIGS. 5A-D, it should be understood that alternate techniques for defining a locomotive's trail only health attribute value may be employed.

The example process flows of FIGS. 5A-E describe how the five health attributes referenced by FIG. 4 may be computed. It is contemplated that the embodiments of FIGS. 5A-E are susceptible to many modifications and that the one or more steps illustrated may be optional and/or may employ fewer health attributes to quantify a locomotive's health.

Furthermore, it should be understood that in some embodiments, the process flows of FIG. 5A-D may be replicated through the use of a mapping table such as that shown by FIG. 6. With such embodiments, the processor 202 may be configured to determine the relevant input data parameters for the subject locomotive, match the values of those parameters to a corresponding entry in the mapping table, and then determine the locomotive health data values to which the input parameter values map via the table. In the mapping table example of FIG. 6, the three leftmost columns of the table ("Color of the Most Severe Defect", "Power Level Code", and "FRA Inspection") correspond to the input parameters and the five rightmost columns of the table corresponds to the five health attributes described by FIG. 4. As can be seen by this table, different permutations of the values for the input parameters map to different permutations of the values for the locomotive health attributes. The trail only health attributes in the "Health Trail Only" column are represented in FIG. 6 by the variable T*, wherein T* would exhibit values consistent with the rules defined by the process flow of FIG. 5E. Thus, in the example of FIG. 6, the processor would then execute the process flow of FIG. 5E to compute the trail only health attribute value.

As the LHC process engine module continues to compute updated locomotive health data for locomotives in a fleet, it may build the LHC database 250 via the DAO component 307. If desired by a practitioner, this database 250 may include new records for each updated locomotive health data instance for a given locomotive. As such, the database 250 may also serve as a historical database that tracks how the health for a locomotive has changed over time. Furthermore, if desired, the database 250 may also be configured to purge or otherwise archive old locomotive health records after a defined amount of time.

FIGS. 7-13 depict various example data structure architectures that may be used to support the LHC processing operations. The system may use these data structures to express the locomotive health attributes described in connection with FIGS. 4-6. Furthermore, the LHC 302 may leverage associations that exist through matching data components of such data structures to facilitate data retrieval and computation operations. Each component of these data structures may include (1) a column name which may take the form of a character string that names the component in a database, (2) a logical name, (3) a data type (e.g., NUMBER (with a defined length), CHAR (with a defined length), VARCHAR2 (with a defined length), and DATE), (4) a nullable flag, and (5) a description. It should be understood that the nullable flag may identify, for an example embodiment, whether the subject column requires a data value.

FIG. 7 depicts an example LHC attribute definition data structure. Example components of such a data structure may include:

An attribute identifier, which may take the form of an Oracle sequence number;

An attribute name to identify the name of the subject attribute;

An attribute description to provide a description of the subject attribute;

A last updated date that provides a date and time that the subject attribute was last updated; and A last updated user ID that identifies who performed the last update to the subject attribute.

FIG. 8 depicts an example LHC attribute value definition data structure. Example components of such a data structure may include:

an attribute value identifier, which may take the form of an Oracle sequence number;

an attribute identifier, as discussed above in connection with FIG. 7;

an attribute value name to identify the name of the subject attribute value;

an attribute value description to provide a description of the subject attribute value;

a last updated date that provides a date and time that the subject attribute value was last updated;

a last updated user ID that identifies who performed the last update the subject attribute value; and a last value full name that identifies the name for the most previous name of the subject attribute value.

FIG. 9 depicts an example LHC health data structure. Example components of such a data structure may include:

an LHC health sequence, which may take the form of an Oracle sequence number;

a physical resource identifier which identifies the locomotive associated with the subject LHC health data structure, a condition color code (which may take the form of, e.g., the overall health attribute value computed by FIG. 5A);

a power level code (which may take the form of, e.g., the power level health attribute value computed by FIG. 5B);

a trail only indicator (which may take the form of, e.g., the trail only health attribute value computed by FIG. 5E);

a health reason (which may take the form of, e.g., the health reason attribute value computed by FIG. 5D);

a defect severity color code (which may take the form of, e.g., the defect severity health attribute value computed by FIG. 5C), an active indicator to indicate whether the subject record is current or historical with respect to the subject locomotive;

health comments which may hold any comments that have been entered into a record for the subject locomotive;

a created date to identify a date and time that the subject record was created;

a last updated date to identify a date and time that the subject record was last updated;

a last updated user ID to identify who performed the last update with respect to the subject record; and a health color change date to identify the date on which the Condition Color Code was most recently changed.

FIG. 10 depicts an example locomotive health reason source association data structure. This data structure may serve to associate locomotive health data for a locomotive with the source that triggered the computation of that locomotive health data. For example, the data structure specified by FIG. 10 may denote an association between an instance of computed locomotive health for a locomotive with a new defect reported by the DRS 304. Example components of such a data structure may include:

an LHC health sequence, which may correspond to the corresponding component from FIG. 9;

an attribute identifier, which may correspond to the corresponding component from FIGS. 7 and 8;

a source identifier, which may correspond to the corresponding component from FIG. 11;

a reason text to provide an explanation for the overall health condition;

a last updated date to identify a date and time that the subject record was last updated; and a last updated user ID to identify who performed the last update with respect to the subject record.

FIG. 11 depicts an example locomotive health reason source data structure. Example components of such a data structure may include:

a source identifier, which may take the form of an Oracle sequence number;

a physical resource identifier which identifies the locomotive associated with the subject locomotive health reason source data structure; and a source type which may take the form of a key identifier on a source system from which the locomotive health is determined (e.g., a defects source, an inspections source, or a status change source).

FIG. 12 depicts an example defect source data structure. A defect source data structure may represent a defect reported by the DRS 304. The data that populates the defect source data structure may emanate from a message posted by the DRS 304 in queue 310. Example components of such a data structure may include:

a source identifier, which may correspond to the source identifier component of FIG. 11;

a defect identifier to identify a defect occurrence within the system;

a severity color code to identify a defect severity code for the subject defect occurrence;

a power level code to identify a power level code for the subject locomotive to which the defect occurrence is applicable;

a trail only indicator to identify whether the subject locomotive to which the defect occurrence is applicable is designated for use only as a trail locomotive;

a last updated date to identify a date and time that the subject record was last updated; and a created date to identify a date and time that the subject record was created.

FIG. 13 depicts an example locomotive health inspection source data structure. A locomotive health inspection source data structure may represent an inspection reported by the scheduling engine 306. The data that populates the locomotive health inspection source data structure may emanate from a message posted by the scheduling engine 306 in queue 310. Example components of such a data structure may include:

a source identifier, which may correspond to the source identifier component of FIG. 11;

an inspection identifier to identify a particular inspection within the system;

an inspection code to identify an inspection type for the subject inspection (e.g., a periodic inspection (PI), an annual inspection (AI), etc.);

an inspection due date that identifies a date on which the subject inspection is due;

a last updated date to identify a date and time that the subject record was last updated;

a last updated user ID to identify who performed the last update with respect to the subject record; and a created date to identify a date and time that the subject record was created.

Returning to FIG. 3A, the LHC database 250 may thus be configured to store data representative of the computed health for a plurality of locomotives. This locomotive health data may then be accessed by a variety of other software applications.

For example, an application configured to access, review, and manage the locomotive health data itself may access the database 250. Such an application may be configured as one or more LHC web clients 312. FIG. 14 depicts an example of a user interface for a search function of the one or more LHC web clients 312. Such an interface may be configured to permit a user to query for current and/or historic locomotive health data for one or more locomotives according to a variety of search criteria (as shown by the "Search Criteria" portion of the FIG. 14 user interface). Thus, the user interface may be configured to permit a user to search for the health data relating to a specific locomotive or to locomotives of a specific locomotive type or model. The user interface may also be configured to permit a user to search for all locomotives having particular values for any of the various health attributes discussed above. Moreover, through the LHC status data component, the user may define whether the search should be limited to current health data or should also include historical health data.

FIG. 15 depicts an example of a user interface that provides locomotive health details for a specific locomotive after the user has entered a query for that locomotive via the user interface of FIG. 14. The application may access the locomotive health data structure for the specified locomotive and present aspects of this locomotive's computed health data through the user interface. A "Locomotive Health Condition" section may summarize the computed health indicator attributes and other aspects of locomotive health as shown in FIG. 15. Section 1500 may itemize and describe various defects that may be applicable to the subject locomotive, including any applicable "Open Defect(s)".

Section 1502 may itemize and describe the inspections that are applicable to the subject locomotive. Each inspection may be identified by a work code that describes the nature of an inspection (for example, work codes for a periodic inspection (PI) (which may be a 92 day federal periodic inspection), an eductor cleaning (EC), an annual periodic inspection (AI), and an air brake change (B1)), an actual last inspection date for each inspection, and a next scheduled date for each inspection.

FIG. 15 may also include a "Health Calculation History (Reason and Date)" section 1504 that identifies when the locomotive health was previously calculated and re-calculated for the subject locomotive as well as a trigger reason for such calculation/re-calculation (e.g., new defect data, new inspection data).

As such, the one or more LHC web clients 312 may be configured to provide users with an ability to search for, access, and review locomotive health data in a variety of contexts.

Furthermore, as shown in FIG. 3A, other applications 252 may access and leverage the locomotive health data in database 250 to facilitate locomotive management and decision-making about assignments of locomotives to train consists. Examples of such applications may include a locomotive management system (LMS) application and a train control system (TCS) application. These applications 252 may communicate with the LHC 302 through any of a number of mechanisms, examples of which may include Java Messaging Service (JMS) topics and an enterprise service bus (ESB).

FIGS. 16A and B depict an example user interface for an example LMS application that may serve as an application 252. The LMS application may be configured as a tool that permits managers to assign locomotives to trains and also assign power to locomotives within the trains. Through the user interface of FIGS. 16A-B, a user may query for relevant information about a locomotive to support decision-making about locomotive usage. Items of interest that may be provided through the user interface include locomotive health data, as shown at the lower part of FIG. 16A and in FIG. 16B. This section of the user interface displays various aspects of the computed health attributes for the subject locomotive and thus provides a user with a concise and standardized summary of health data for the locomotive to aid the manager's decision-making.

Figure 17:
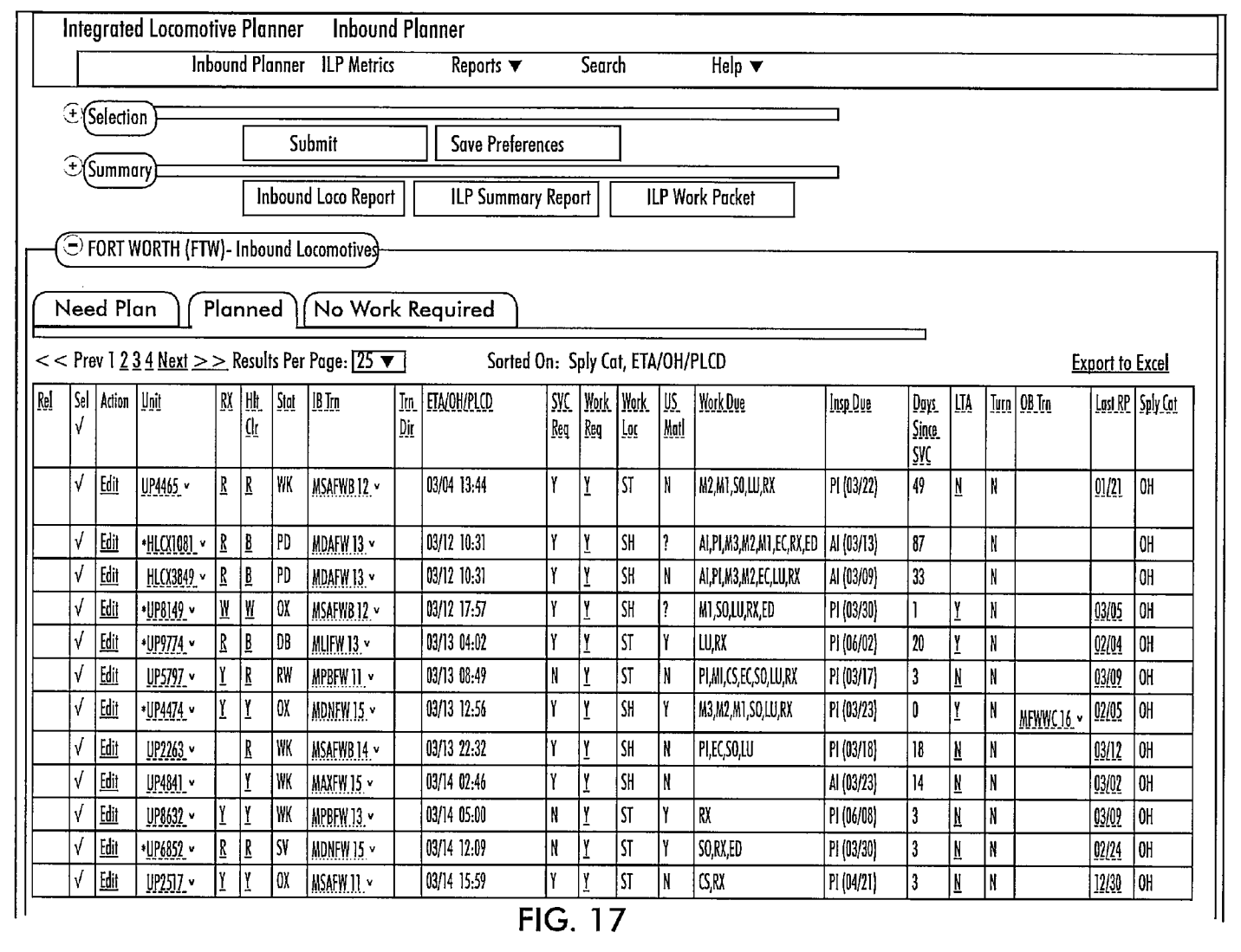

FIG. 17 depicts an example user interface for an example locomotive planning system application that may serve as an application 252. The locomotive planning system application may be configured to serve as a tool for creating travel plans and assigning locomotives to such travel plans. For each locomotive from a set of locomotives that might be assigned to a travel plan, the user interface may include computed locomotive health data for each such locomotive. For example, FIG. 17 shows a list of inbound locomotives relevant to a plan being worked on by a user. Each locomotive is listed along with a display of its computed overall health attribute value (i.e., the column labeled "Hlt Clr" (or Health Color), which includes the color code for each locomotive's computed overall health attribute value). This may provide the user with concise and standardized health information to help him decide which locomotives should be assigned to a plan. As previously noted, any of a variety of techniques may be used to communicate the health of each locomotive which may include techniques other than or in addition to color coding.

FIGS. 18A-D depict an example user interface for an example LMS application that may serve as an application 252. The user interface of FIGS. 18A-D provides a yard level graphical display that identifies inbound trains, outbound trains, and arrived trains for a relevant train yard. This display may provide a manager with a view of locomotive assignments for outbound trains (that are due to depart from the relevant yard during a specified time period), inbound trains (that are due to arrive at the relevant yard during the specified time period), and a view of locomotives at the yard that are ready to work, being serviced, and recently arrived. The user interface may graphically display an icon for each locomotive, and a manager may make decisions regarding train and power assignments for the various locomotives. The locomotive icons may be displayed together with information that expresses the locomotives' computed health data. For example, each locomotive icon may graphically display a color coding or other indicia corresponding to the locomotive's computed overall health attributes.

Figure 19:
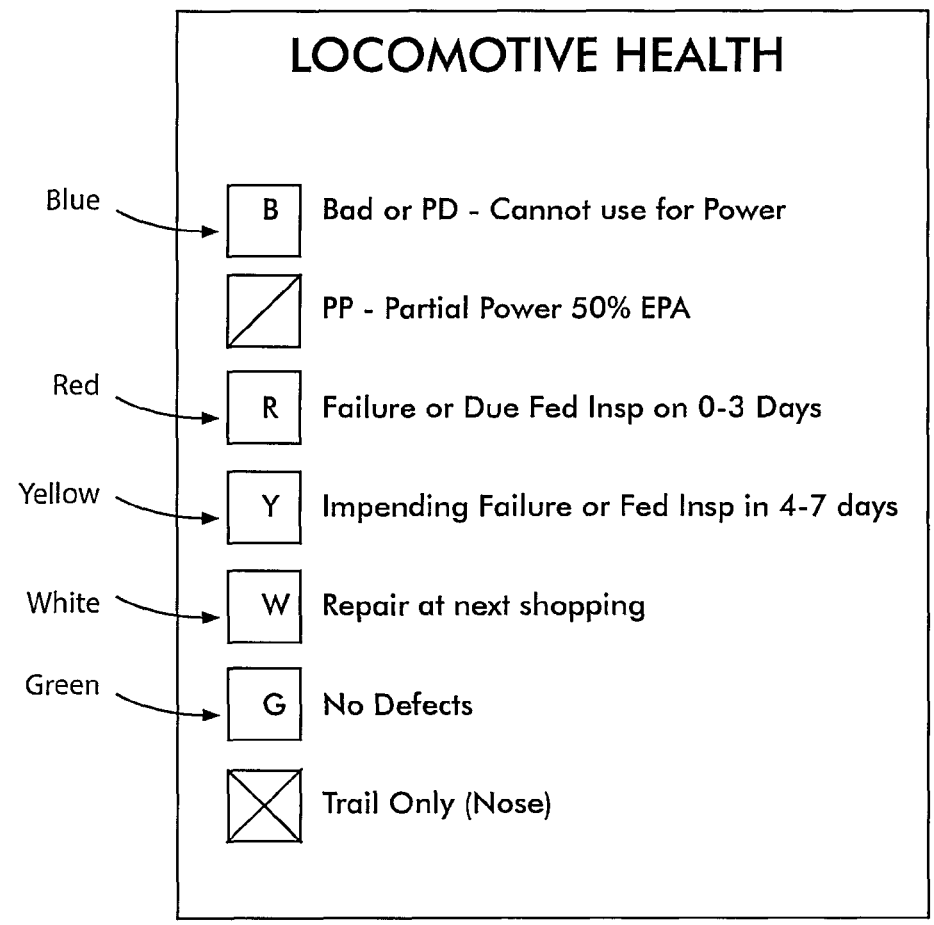
FIG. 19 depicts an example legend for graphically communicating a calculated health status for a locomotive in accordance with various embodiments.

A legend such as the one shown by FIG. 19 may be made available to the user for the user to interpret this health information. The legend may provide the user with concise and standardized health information to help the user determine whether a locomotive should be used, not used, or further inspected (or otherwise help the user's decision-making about locomotive management). With the example of FIG. 19, it can be seen that the legend for locomotive health information is similar in nature to the health attribute values discussed in connection with FIG. 4. Furthermore, if desired by a practitioner, each locomotive icon shown by FIGS. 18B-D may be selectable through the user interface to access more detailed health information about the locomotive associated with the locomotive icon (e.g., a locomotive icon may be selectable via a right or left click whereupon the system application navigates the user to a screen such as that shown by FIG. 15).

After locomotives have been assigned to trains via these locomotive planning or management applications taking into consideration the computed locomotive health values, the trains with the assigned locomotives may be operated under power to move freight and/or people along the railway tracks in accordance with a travel plan.

The foregoing description has described several example embodiments for which the particular details of the examples illustrated herein are not meant to be limiting, and it is therefore contemplated that other changes, modifications, variations, applications and other uses, or equivalents thereof, will fall within the scope of the entire disclosure. All such changes, modifications, variations and other uses and applications which do not depart from the spirit and scope of the invention are deemed to be encompassed by this disclosure.

What is claimed is:

1. A train control system based on locomotive health comprising:
a processor; and
a memory in which a plurality of processor-executable instructions are stored, the instructions being configured, upon execution by the processor, to cause the train control system to:
process data about a plurality of locomotives, the processed data comprising defect data for the locomotives and inspection schedule data for the locomotives,
compute health data for each of a plurality of the locomotives based on the processed defect data and the processed inspection schedule data applicable to those locomotives (i) based on a common standard for locomotive health and (ii) on a real-time basis as at least one of new defect data and new inspection schedule data for the locomotives becomes available to the processor, and
assign at least one of (1) a plurality of the locomotives to a plurality of train consists based on the computed locomotive health data, and (2) locomotive power to a plurality of locomotives for a plurality of train consists based on the computed locomotive health data;
wherein the processor is configured to execute the instructions.

2. The train control system of claim 1 further comprising:
a database configured to store data about a locomotive pool comprising the locomotives;
wherein the processor comprises a plurality of processors, the processors including a first processor that is part of a defect data computer system, a second processor that is part of an inspection data computer system, a third processor that is part of a locomotive health computer system, and a fourth processor that is part of a locomotive assignment computer system;
the defect data computer system configured to process defect data for a plurality of the locomotives in the pool;
the inspection schedule data computer system configured to process inspection schedule data for a plurality of the locomotives in the pool; and
wherein the locomotive health computer system is configured for communication with the database, the defect data computer system, the inspection schedule data computer system, and the locomotive assignment computer system.

3. The train control system of claim 2 wherein the defect data computer system is further configured to generate, on a real-time basis, a health event message as new defect data becomes available within the defect data computer system that is used by the common standard for locomotive health;
wherein the inspection schedule data computer system is further configured to generate, on a real-time basis, a health event message as new inspection schedule data becomes available within the inspection schedule data computer system that is used by the common standard for locomotive health; and
wherein the locomotive health computer system is further configured to, on a real-time basis, (1) receive the health event messages generated by the defect data computer system and the inspection schedule data computer system, and (2) trigger new locomotive health computations for a plurality of locomotives based on the received health event messages.

4. The train control system of claim 3 wherein a plurality of the health event messages exhibit different formats based on a source for the health event message; and
wherein the locomotive health computer system is further configured to (1) determine a source for a received health event message, and (2) parse each received health event message based on its determined source.

5. The train control system of claim 2
wherein the locomotive health computer system is further configured for communication with the locomotive assignment computer system such that changes in computed locomotive health for locomotives are communicated to the locomotive assignment computer system on a real-time basis; and
wherein the locomotive assignment computer system is further configured to (1) assign at least one of (i) a plurality of locomotives to a plurality of train consists based on input from a user, and (ii) locomotive power to a plurality of locomotives for a plurality of train consists based on input from a user, and (2) on a real-time basis, automatically adjust a locomotive assignment based on a communicated change in computed locomotive health for a locomotive.

6. The train control system of claim 2 wherein the locomotive health computer system is further configured to compute a plurality of different health attribute values for a plurality of the locomotives based on the defect data and the inspection schedule data, wherein the computed health attribute values comprise the computed locomotive health data.

7. The train control system of claim 6 wherein the defect data comprises open defect data, and wherein the locomotive health computer system is further configured to compute an overall health attribute value for a plurality of the locomotives based on the open defect data and the inspection schedule data.

8. The train control system of claim 7 wherein the locomotive health computer system is further configured to compute a defect severity health attribute value for a plurality of the locomotives based on the open defect data.

9. The train control system of claim 7 wherein the processed data further comprises power level data for a plurality of the locomotives, and wherein the locomotive health computer system is further configured to compute a power level health attribute value for a plurality of the locomotives based on the inspection schedule data and the power level data.

10. The train control system of claim 7 wherein the processed data further comprises power level data for a plurality of the locomotives, and wherein the locomotive health computer system is further configured to compute a trail only locomotive health attribute value for a plurality of the locomotives based on the open defect data, the inspection schedule data, and the power level data.

11. The train control system of claim 7 wherein the computed health attribute values further comprise at least two members of the group consisting of (1) a defect severity health attribute value, (2) a power level health attribute value, (3) a health reason attribute value, and (4) a trail only health attribute value.

12. The train control system of claim 6 wherein the locomotive health computer system is further configured to automatically perform the locomotive health data computation operation in response to an event trigger, the event trigger comprising at least one member of the group consisting of (1) a change in the defect data corresponding to a new open defect, (2) a change in the defect data corresponding to a closing of a formerly open defect, (3) a change in the inspection schedule data, (4) a mileage threshold for the locomotive being reached, and (5) a maintenance threshold for the locomotive being reached.

13. The train control system of claim 2 wherein the computed locomotive health data is configured to exhibit any of a plurality of values that are indicative of varying levels of health severity, wherein the processed data comprises power level data for a plurality of the locomotives, and wherein the locomotive health computer system is further configured to define a health value for a locomotive that is indicative of a high severity in response to the power level data indicating no power for that locomotive.

14. The train control system of claim 2 wherein the computed locomotive health data is configured to exhibit any of a plurality of values that are indicative of varying levels of health severity, and wherein the locomotive health computer system is further configured to define a health value for a locomotive that is indicative of a high severity in response to the inspection data for that locomotive indicating that an inspection for that locomotive is past due.

15. The train control system of claim 2 wherein the computed locomotive health data is configured to exhibit any of a plurality of values that are indicative of varying levels of health severity, wherein the defect data comprises open defect data, the open defect data corresponding to an open defect for a locomotive and including a severity indicator for that locomotive's open defect, and wherein the locomotive health computer system is further configured to define a health value for that locomotive that is indicative of a severity that is based on the open defect severity indicator.

16. The train control system of claim 2 wherein the computed locomotive health data is configured to exhibit any of a plurality of values that are indicative of varying levels of health severity, wherein the locomotive health computer system is further configured to define a plurality of values for a plurality of the locomotives with respect to a plurality of health attributes based on a plurality of associations in a mapping table, the mapping table configured to associate a plurality of values for inspection schedule data and defect data with a plurality of values for the health attributes.

17. The train control system of claim 1 wherein the computed locomotive health data is configured to exhibit any of a plurality of values that are indicative of varying levels of health severity, wherein the received locomotive data further comprises power level data for a plurality of the locomotives, wherein the defect data comprises open defect data, the open defect data corresponding to a plurality of open defects for a plurality of locomotives and including a plurality of severity indicators for same, and wherein the instructions, upon execution by the processor, are further configured to cause the train control system to:
determine a power level for a locomotive based on the received power level data;
determine whether the power level for the locomotive indicates no power for the locomotive;
in response to a determination that the power level for the locomotive indicates no power for the locomotive, define a health value for the locomotive that is indicative of a high severity;
in response to a determination the power level for the locomotive does not indicate no power for the locomotive, determine based on the inspection schedule data for the locomotive whether an inspection is past due for the locomotive;

in response to a determination that an inspection is past due for the locomotive, define a health value for the locomotive that is indicative of a high severity;

in response to a determination that an inspection is not past due for the locomotive, determine whether there is at least one open defect for the locomotive;

in response to a determination that there is at least one open defect for the locomotive, define a health value for the locomotive that is indicative of a severity that is based on a most severe of the at least one open defect severity indicators for the locomotive; and in response to a determination that there are no open defects for the locomotive, (1) determine a next inspection date for the locomotive and (2) define a health value for the locomotive that is indicative of a severity based on an imminence of the determined next inspection date such that the defined health value severity increases as a function of increasing next inspection imminence.

18. The train control system of claim 1 wherein the instructions, upon execution by the processor, are further configured to cause the train control system to:

determine, for each of a plurality of the locomotives, changes in computed locomotive health data values;

de-assign a locomotive with respect to a train consist that has not yet departed a station in response to a determination that the change in computed locomotive health data values for that locomotive corresponds to a downgrade in locomotive health that satisfies a condition; and generate a notification for a user about the de-assignment.

19. The train control system of claim 1 wherein the instructions, upon execution by the processor, are further configured to cause the train control system to:

determine, for each of a plurality of the locomotives, changes in computed locomotive health data values; and remove a locomotive from a pool of locomotives eligible for assignment to train consists in response to a determination that the change in computed locomotive health data values for that locomotive corresponds to a downgrade in locomotive health that satisfies a condition; and perform the assignment operation based on the locomotives in the pool.

20. The train control system of claim 1 wherein the instructions, upon execution by the processor, are further configured to cause the train control system to:

determine, for each of a plurality of the locomotives, changes in computed locomotive health data values; and add a locomotive to a pool of locomotives eligible for assignment to train consists in response to a determination that the change in computed locomotive health data values for that locomotive corresponds to an upgrade in locomotive health that satisfies a condition; and perform the assignment operation based on the locomotives in the pool.

21. A method of controlling train operations comprising:

a processor receiving defect data for a plurality of locomotives and inspection schedule data for the locomotives;

the processor computing health data for each of a plurality of the locomotives according to a common standard for locomotive health and based on the defect data and the inspection schedule data applicable to those locomotives, wherein the processor performs the computing step in real-time as at least one of new defect data and new inspection schedule data becomes available for the locomotives;

the processor assigning at least one of (1) a plurality of the locomotives to a plurality of train consists based on the computed locomotive health data, and (2) locomotive power to a plurality of locomotives for a plurality of train consists based on the computed locomotive health data; and operating the train consists in accordance with the assigning.

22. The method of claim 21 further comprising:

the processor determining, for each of a plurality of the locomotives, changes in computed locomotive health data values;

the processor de-assigning a locomotive with respect to a train consist that has not yet departed a station in response to a determination that the change in computed locomotive health data values for that locomotive corresponds to a downgrade in locomotive health that satisfies a condition; and the processor generating a notification for a user about the de-assignment.

23. The method of claim 21 further comprising:

the processor determining, for each of a plurality of the locomotives, changes in computed locomotive health data values; and the processor removing a locomotive from a pool of locomotives eligible for assignment to train consists in response to a determination that the change in computed locomotive health data values for that locomotive corresponds to a downgrade in locomotive health that satisfies a condition; and wherein the assigning step comprises the processor performing the assigning step based on the locomotives in the pool.

24. The method of claim 21 further comprising:

the processor determining, for each of a plurality of the locomotives, changes in computed locomotive health data values; and the processor adding a locomotive to a pool of locomotives eligible for assignment to train consists in response to a determination that the change in computed locomotive health data values for that locomotive corresponds to an upgrade in locomotive health that satisfies a condition; and wherein the assigning step comprises the processor performing the assigning step based on the locomotives in the pool.

25. The method of claim 21 wherein the computed locomotive health data exhibits any of a plurality of values that are indicative of varying levels of health severity, wherein the received locomotive data further comprises power level data for a plurality of the locomotives, wherein the defect data comprises open defect data, the open defect data corresponding to a plurality of open defects for a plurality of locomotives and including a plurality of severity indicators for same, and wherein the computing step comprises, for each of a plurality of the locomotives, the processor:

determining a power level for a locomotive based on the received power level data;

determining whether the power level for the locomotive indicates no power for the locomotive;

in response to a determination that the power level for the locomotive indicates no power for the locomotive, defining a health value for the locomotive that is indicative of a high severity;

in response to a determination the power level for the locomotive does not indicate no power for the locomotive, determining based on the inspection schedule data for the locomotive whether an inspection is past due for the locomotive;

in response to a determination that an inspection is past due for the locomotive, defining a health value for the locomotive that is indicative of a high severity;

in response to a determination that an inspection is not past due for the locomotive, determining whether there is at least one open defect for the locomotive;

in response to a determination that there is at least one open defect for the locomotive, defining a health value for the locomotive that is indicative of a severity that is based on a most severe of the at least one open defect severity indicators for the locomotive; and in response to a determination that there are no open defects for the locomotive, (1) determining a next inspection date for the locomotive and (2) defining a health value for the locomotive that is indicative of a severity based on an imminence of the determined next inspection date such that the defined health value severity increases as a function of increasing next inspection imminence.

26. The method of claim 21 wherein the processor comprises a plurality of processors.

27. The method of claim 26 wherein the processors include a first processor and a second processor, the first processor performing the computing step and the second processor performing the assigning step.

* * * * *